(12) United States Patent
Beshara

(10) Patent No.: US 8,684,325 B1
(45) Date of Patent: Apr. 1, 2014

(54) CONCEALABLE TV MOUNT EXTENDS AND ROTATES

(76) Inventor: Mark Joseph Beshara, Boise, ID (US)

( * ) Notice: Subject to any disclaimer, the term of this patent is extended or adjusted under 35 U.S.C. 154(b) by 170 days.

(21) Appl. No.: 13/078,923

(22) Filed: Apr. 1, 2011

Related U.S. Application Data

(60) Provisional application No. 61/320,263, filed on Apr. 1, 2010, provisional application No. 61/405,576, filed on Oct. 21, 2010.

(51) Int. Cl.
  *A47F 5/00* (2006.01)
  *F16M 11/00* (2006.01)

(52) U.S. Cl.
  USPC ............... 248/281.11; 248/274.1; 361/679.21

(58) Field of Classification Search
  CPC ........................ G06F 1/1601; F16M 2202/063; F21V 21/24; A47F 5/08
  USPC ........ 248/274.1, 276.1, 281.11, 284.1, 277.1, 248/240, 240.1, 917, 919, 921, 922; 361/679.21
  See application file for complete search history.

(56) References Cited

U.S. PATENT DOCUMENTS

| | | | | |
|---|---|---|---|---|
| 1,070,524 | A * | 8/1913 | Pieper .................... | 248/281.11 |
| 1,159,604 | A | 11/1915 | Soule et al. | |
| 1,271,380 | A | 7/1918 | Soule | |
| 1,758,893 | A | 3/1929 | Schaffert | |
| 3,981,340 | A * | 9/1976 | Anderson et al. .......... | 248/345.1 |
| 4,941,718 | A | 7/1990 | Alexander, III | |
| 4,953,822 | A * | 9/1990 | Sharber et al. ............ | 248/281.11 |
| 5,108,063 | A * | 4/1992 | Koerber et al. ............ | 248/284.1 |
| 5,467,106 | A | 11/1995 | Salomon | |
| 5,505,424 | A * | 4/1996 | Niemann ................... | 248/585 |
| 5,668,570 | A | 9/1997 | Ditzik | |
| 5,924,244 | A | 7/1999 | Ohman | |
| 6,256,078 | B1 | 7/2001 | Ogata | |
| 6,905,101 | B1 * | 6/2005 | Dittmer .................... | 248/274.1 |
| 7,317,611 | B2 | 1/2008 | Dittmer | |
| 7,663,706 | B2 * | 2/2010 | Ryu ........................ | 348/836 |
| 7,748,666 | B2 * | 7/2010 | Oddsen et al. ............ | 248/123.11 |
| 7,828,252 | B2 | 11/2010 | Parsons | |
| 7,866,621 | B1 * | 1/2011 | Walters .................... | 248/421 |
| 8,074,950 | B2 * | 12/2011 | Clary ....................... | 248/280.11 |
| 8,245,990 | B2 * | 8/2012 | Huang ...................... | 248/276.1 |
| 8,313,072 | B2 * | 11/2012 | Bakkom et al. ........... | 248/289.11 |
| 8,333,355 | B2 * | 12/2012 | Stifal et al. .............. | 248/279.1 |
| 2004/0007651 | A1 * | 1/2004 | Williams et al. .......... | 248/346.06 |
| 2005/0152102 | A1 * | 7/2005 | Shin ........................ | 361/681 |
| 2007/0221807 | A1 * | 9/2007 | Park ........................ | 248/324 |
| 2010/0294904 | A1 * | 11/2010 | Dittmer et al. ............ | 248/220.22 |

* cited by examiner

*Primary Examiner* — Anita M King
(74) *Attorney, Agent, or Firm* — Your Intellectual Property Matters, LLC; Robert A. Frohwerk

(57) ABSTRACT

This mounting system can be used to house a television or other appliance against, or in, a wall, ceiling, floor or table. A user may manipulate the position and orientation of the housed appliance from its storage position to an operational position. The entire system can be completely concealed from view by a decorative cover while providing ready access to the appliance. To operate the appliance, the mount provides for extension and/or rotation to a desired position without removal of the concealing cover. A mounting bracket is attached to a fixed structure, and an appliance interface bracket is adapted for attachment to the appliance. A system of linkage arms couples the two brackets. Multiple linkage arm systems accommodate various lengths of extension and degrees of rotation including 180°. In all cases provision is made for concealed containment of all power and control cables necessary for operation of the appliance.

16 Claims, 28 Drawing Sheets

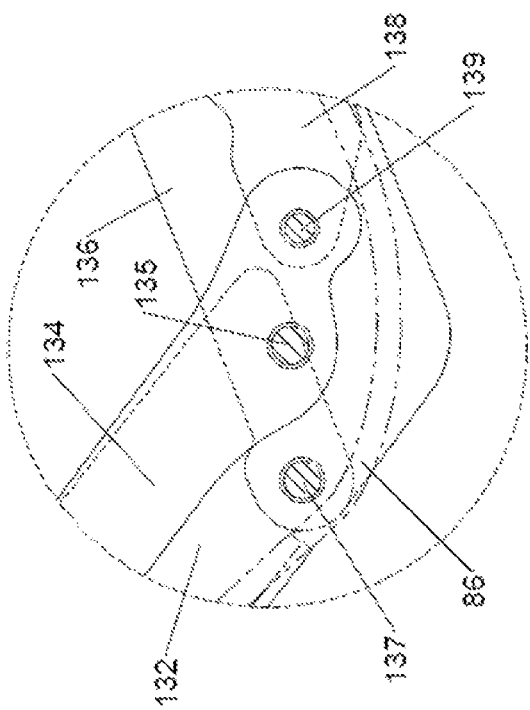
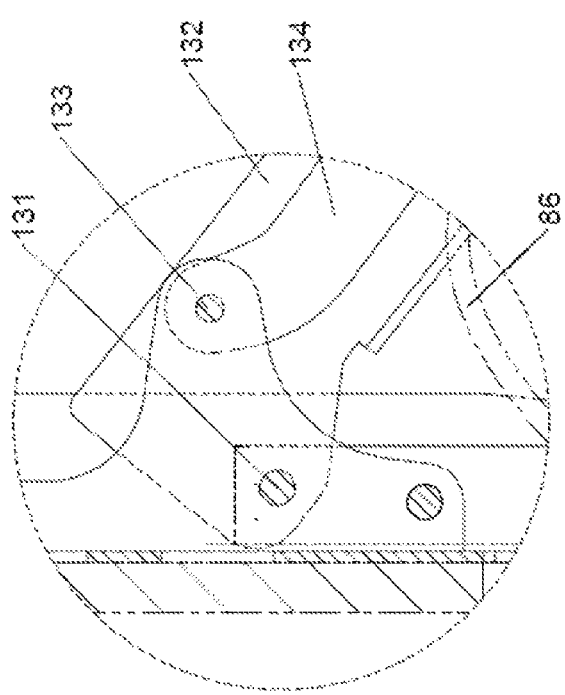

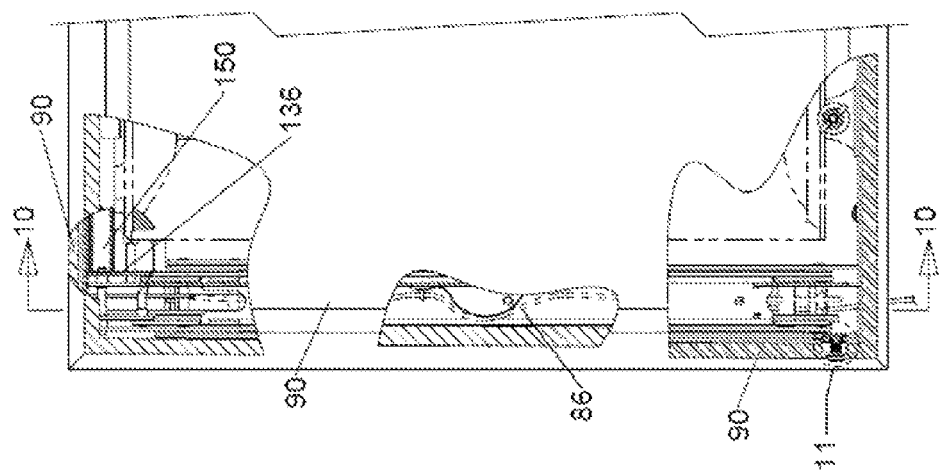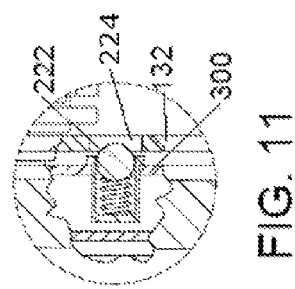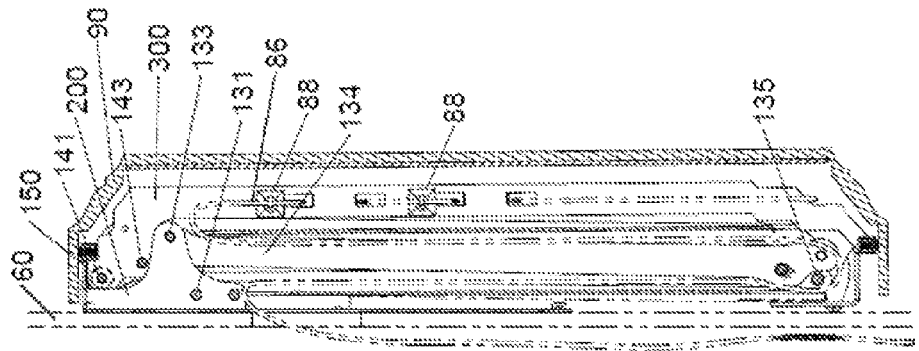

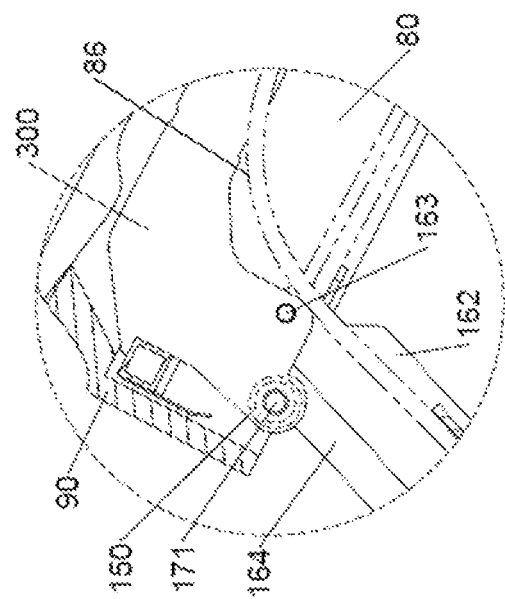
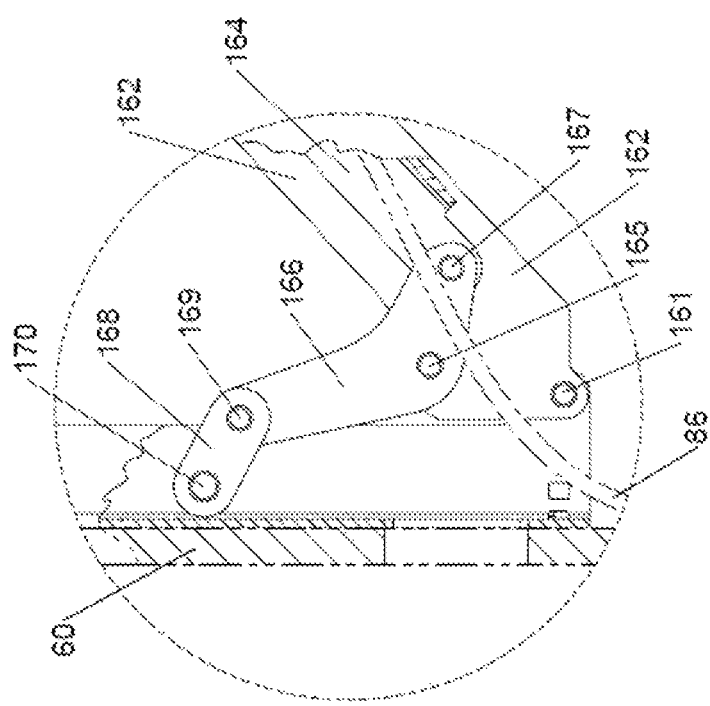

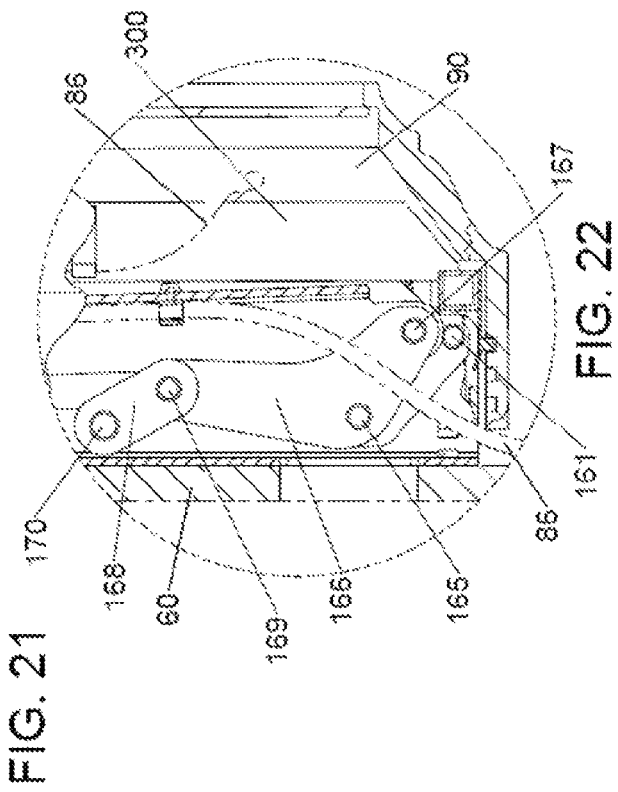
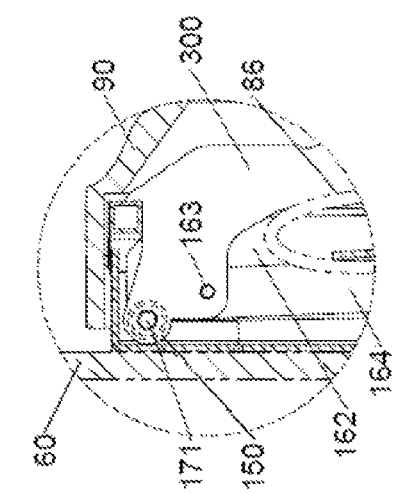
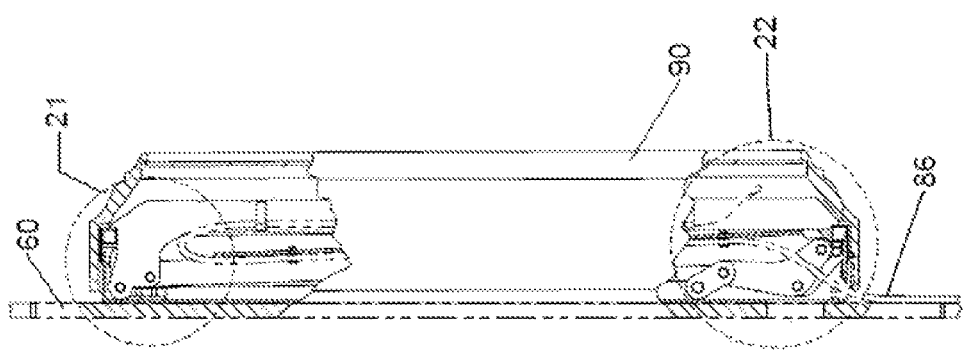

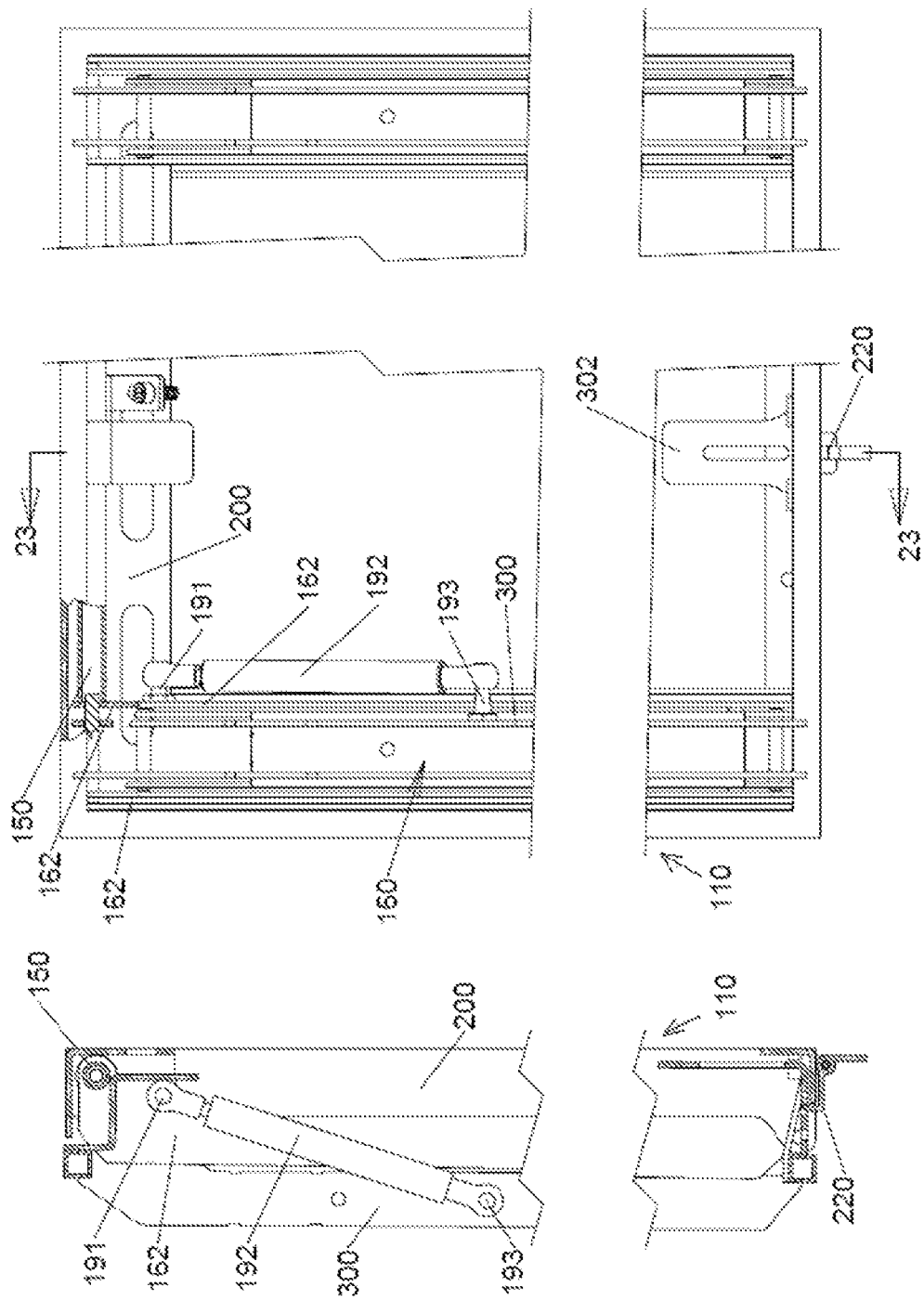

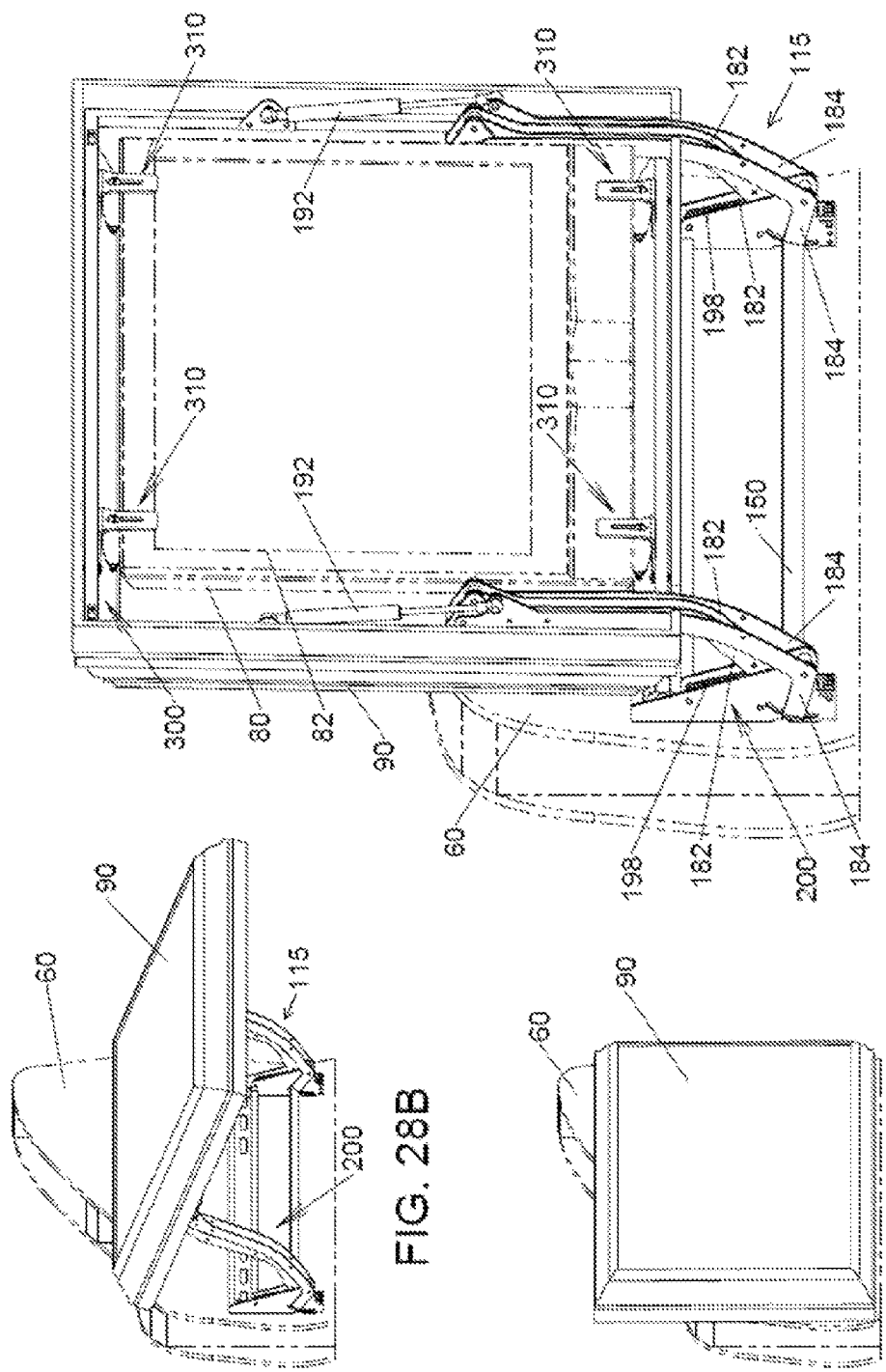

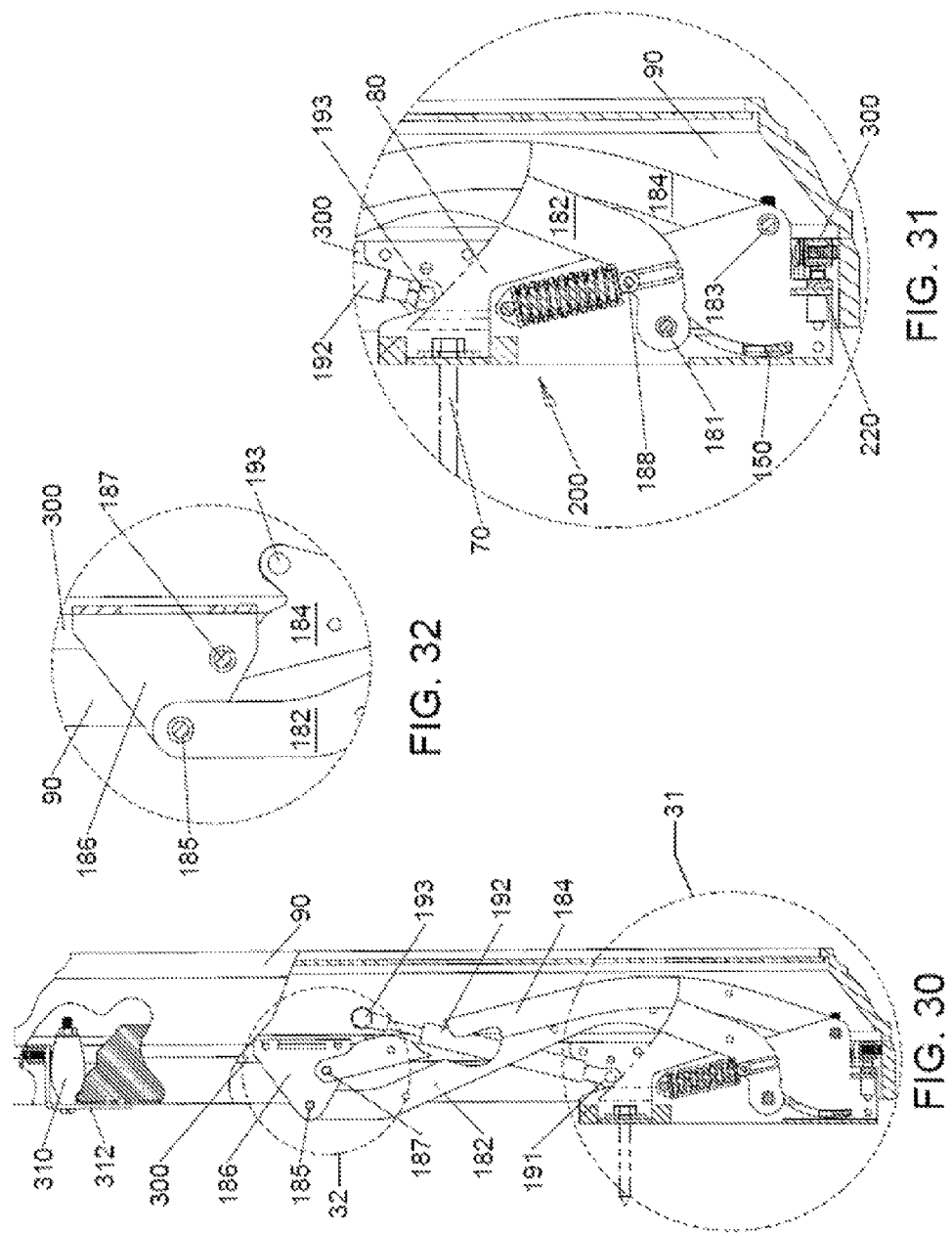

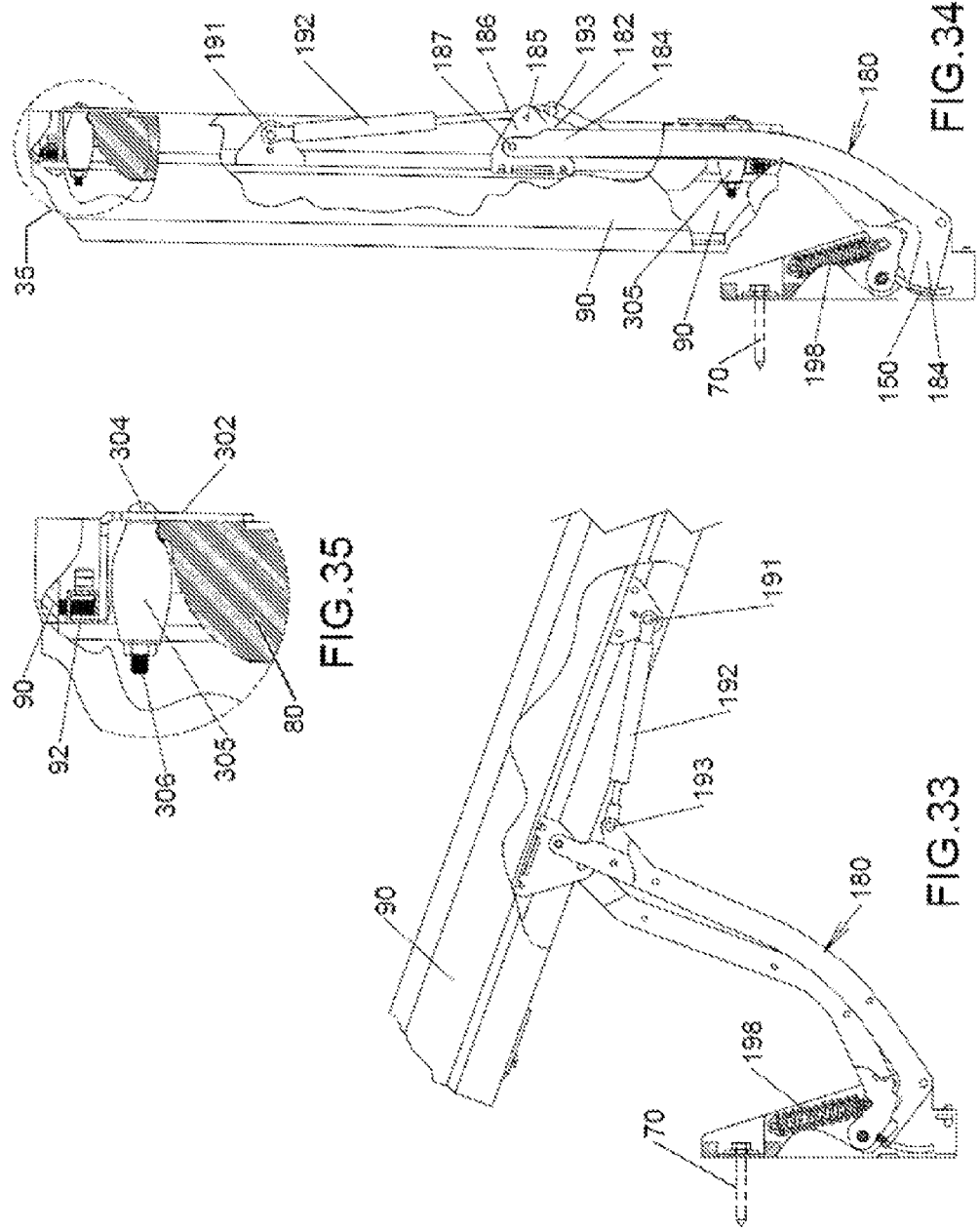

CONCEALABLE TV MOUNT EXTENDS AND ROTATES

CROSS-REFERENCES TO RELATED APPLICATIONS

This application claims benefit of U.S. Provisional Application No. 61/320,263, filed Apr. 1, 2010, entitled "Extendable Mount for Flat-Panel Display", which is incorporated here by reference in its entirety.

This application claims benefit of U.S. Provisional Application No. 61/405,576, filed Oct. 21, 2010, entitled "Operable Appliance Mount", which is incorporated here by reference in its entirety.

FIELD OF THE INVENTION

The present invention relates generally to mounting systems for flat-panel displays, and more particularly to selectively adjustable flat-panel display mounting systems.

BACKGROUND OF THE INVENTION

It is common to view television from a recumbent or resting position. However, in order to do so comfortably would require that the television be mounted high on a wall or in a ceiling, which is at odds with conventional home décor. Another concern of some people is that to be easily viewable a television often demands an overly prominent place in a home or office. It would be desirable to mount a television in such location and position that it could be concealed behind a mirror or piece of artwork when not in use and easily repositioned for viewing. The mounting system to be described here addresses these issues.

BRIEF SUMMARY OF THE INVENTION

The presently described apparatus is a mount that can be used to house an appliance against, or in, a structural surface such as a wall or ceiling. The housed appliance may be, but is not limited to, a television, computer monitor, touch screen, keyboard, control panel, or a safe. The mounting system allows a user to manipulate the position and orientation of the housed appliance from its housed position to another position as desired by the user for operation of the appliance. One significant benefit is that the mount with its attached appliance can be completely concealed from view by a decorative cover while providing ready access for operation of the appliance. When it is desired to operate the appliance, the mount provides for extension and/or rotation to a desired position without removal of, or interference from, the concealing cover.

The described mounting system includes a mounting bracket that is adapted for attachment to a fixed structure. An appliance interface bracket is adaptable for attachment of the appliance. A system of linkage arms couples the appliance interface bracket to the mounting bracket. Multiple linkage arm systems are described here in order to accommodate various lengths of extension and degrees of rotation. In all cases provision is made for concealed containment of all power and control cables necessary for operation of the appliance.

The appliance interface bracket includes a multiplicity of attachment mechanisms for holding an appliance. These attachment mechanisms have sufficient adjustability to accommodate a wide variety of sizes and shapes of appliances. They may include mounting flanges, adjustable brackets, resilient mounts, and clamps, in addition to hardware such as screws and bolts that may be fitted to pre-drilled holes or to slots. It is important that the appliance be supported in such a manner as to prevent damage to it. For the specific application where the appliance is a flat-panel television, it is advantageous to provide a resilient support to its face or perimeter.

The linkage arms are designed to guide the supported appliance through a defined, predetermined path. The described mechanisms minimize the force required by the user or a motor to open or close the mounting system by using link configurations that neutralize the forces acting in any direction as the mounting system is transitioned from one position to another. Any forces that act to move the mounting system in a particular direction at any given point along the defined path can be countered by use of springs, friction, etc. The weight of the mounting system components themselves, along with that of the installed appliance, is used to equalize forces. This result is that the appliance is rotated as it moves out from or in toward the mounting surface to achieve the desired operating position, or where the appliance is a TV to place the display in a proper viewing position.

BRIEF DESCRIPTION OF THE DRAWINGS

The particular features and advantages of the system and method briefly described above as well as other objects will become apparent from the following description taken in conjunction with the accompanying drawings, in which:

FIG. 9 depicts a front plan view of a mounting system with partial cutouts of a cover;

FIG. 10 is a cross-section view of FIG. 9;

FIG. 11 shows a detail of a detented holding mechanism;

FIG. 15C is a view of a fully extended mounting system from behind a wall toward the underside of a covered appliance;

FIG. 20 shows in cross-section an appliance mounted to a wall with the mounting system in a closed position and the cover partially cut away, details are in FIGS. 21-22;

FIGS. 23-24 show a side view and plan view, respectively, of use of a gas spring to assist in opening and closing the mounting system, and a latch to in a closed position;

FIG. 28A-C is a series of isometric drawings showing a mounting system concealing a covered appliance against a wall (FIG. 28A), partially extended in FIG. 28B for viewing of the appliance from below, and fully rotated in FIG. 28C for viewing from across a room;

FIG. 30 shows a side view of a covered mounting system with the cover partially cut expose springs used for balance;

FIG. 31 is a detail of a spring used in the lower portion of FIG. 30;

FIG. 32 is a detail of linkage connections in FIG. 30;

FIG. 33 shows a side view of the mounting system of FIG. 30 in its partially extended position;

FIG. 34 is a side view of the mounting system in its fully reversed position with its cover partially cut away to expose its linkages;

FIG. 35 shows a detail of an appliance mount;

Figure 1:
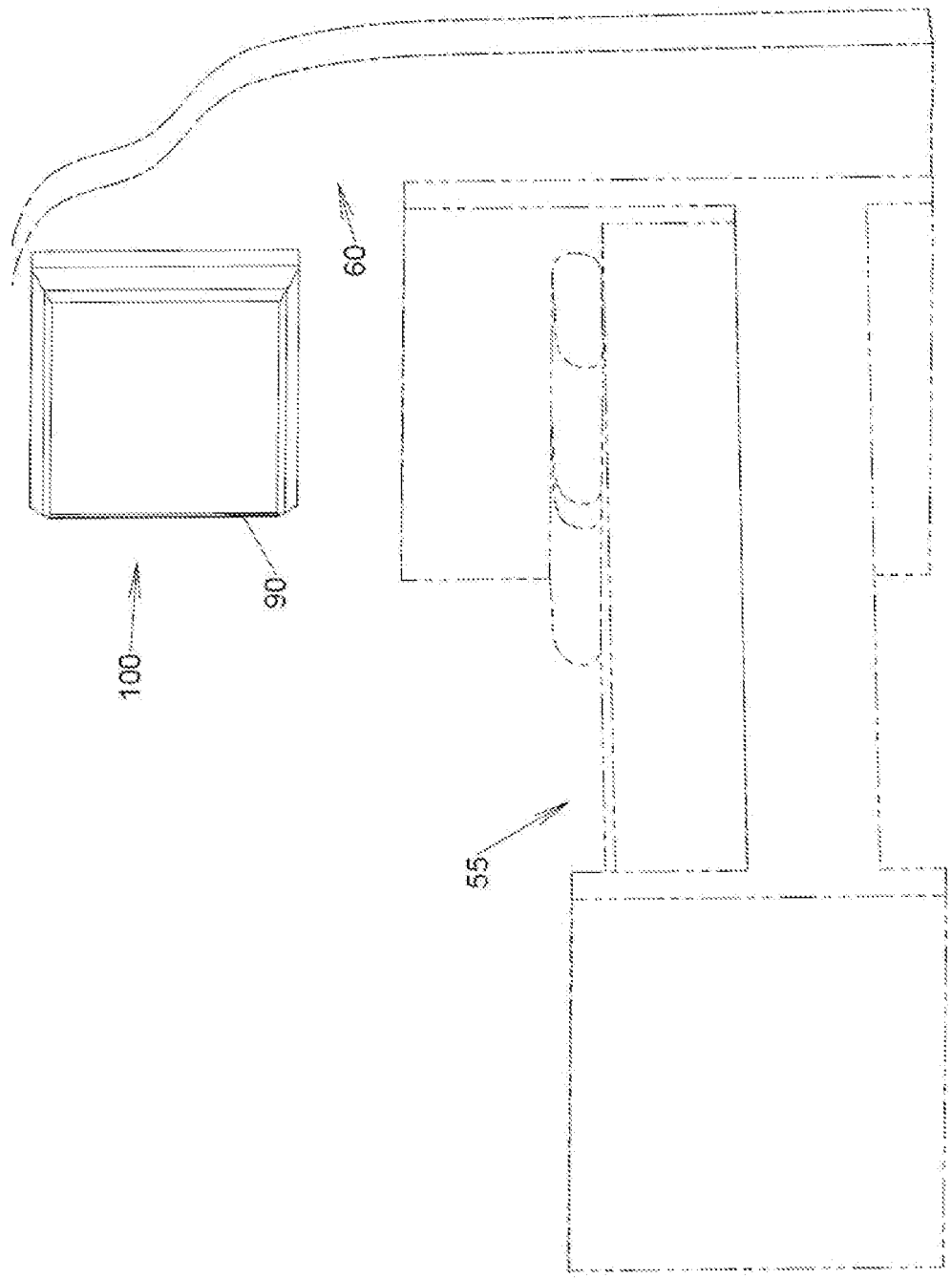
FIG. 1 shows a mounting system concealing an appliance against a wall above a bed.

The following Reference Numbers may be used in conjunction with one or more of the accompanying FIGS. 1-38 of the drawings:

50 User, Operator
55 Bed, Sofa or other reclining support
60 Wall
62 Ceiling
70 Bolt, Lag Screw, or equivalent mounting hardware
80 Appliance, such as a flat-panel television
82 Face, Front of Appliance
84 Back of Appliance
86 Wiring for Appliance
88 Wire Guide
90 Cover, Aesthetic
92 Mounting Mechanism for Cover
100 Mounting System, general
105 Mounting System, Flip-Out Extended
110 Mounting System, Flip-Out
115 Mounting System, Flip-Around
120 Extension Arm
130 Support Arm
131 Pivot
132 First Link of Lower Support Arm
133 Pivot
134 Second Link of Lower Support Arm
135 Pivot
136 First Link of Upper Support Arm
137 Pivot
138 Second Link of Upper Support Arm
139, 141, 143 Pivot
150 Stabilizer
160 Support Arm
162 First Link of Support Arm
163 Pivot
164 Second Link of Support Arm
165 Pivot
166 Angled Link of Support Arm
167 Pivot
168 Short Link of Support Arm
169, 170, 171 Pivot
180 Support Arm
181 Pivot
182 First Link of Support Arm
183 Pivot
184 Second Link of Support Arm
185 Pivot
186 Support Flange
187 Pivot
188 Connecting Rod
190 Power source, mechanical
191 upper end of mechanical power source
192 Gas spring
193 lower end of mechanical power source
194 Motor
195 Linear Actuator
196 Motor Control
197 Gear drive assembly
198 Coil Spring
200 Mounting Bracket
210 Aperture, Mounting
212 Aperture, side mounting
220 Latch
222 Plunger Ball Pin
224 Detent
300 Appliance Interface Bracket
302 Mounting Tab
303, 304 Mounting Screw
305 Resilient Mount
306 Nut, such as a Wing Nut
310 Appliance Mount
312 Height Adjustment Bracket
314 Apertures for mounting
402 cable, or wire rope
403 pulley
404 link
405 slide
406 link
407 bearing
408 link
409 slide
410 link
411 pivot
412 link
413 pivot
414 track, curved
415 pivot
416 bearing
417, 419 pivot
420 support bracket
421 pivot
422 terminal
423 pulley 424 link
432 terminal
433 pulley
434, 436 guide, curved

DETAILED DESCRIPTION OF THE INVENTION

The mounting systems and associated methods described here may be used wherever it is desired to store an appliance in a concealed manner, while supporting it in such a state that it is readily accessible when it is necessary to operate the appliance. The appliance can be concealed on, or in, a wall, a ceiling, or under a countertop. Although the presently described mounting system will accommodate a variety of appliances, the focus of the following discussion will relate to storage and use of the general class of flat-panel televisions.

As described here, a mechanical system supports an appliance and rotates it into a desired position for operation as the appliance is moved away from a supporting structure. Any appliance can be described as having an operational or working face that must be available to a user when it is in a working position for use. In the case of a TV the working face is the display side and a working position is any orientation that allows a user to comfortably watch television, hence a viewing position. Typical appliances of all kinds have some form of attachment base that is generally opposite the working face. It is the attachment base that is held in place to position the working face of the appliance for use.

Provision is made in the mounting systems to be described here for the appliance to be installed so that it faces toward the supporting structure, such as a wall or ceiling, where it can be embedded into a cavity within the structure, or it can be mounted flush to a surface of the structure, as appropriate to provide a user with optimal accessibility.

In configurations where the appliance is installed with its face toward the supporting structure, the appliance can be concealed by any of a number of aesthetic covers such as a framed picture, mirror, paneling, or another cover of the user's choice. The aesthetic cover is adjustable so that when the mounted appliance is in a closed position the cover can be made to be parallel to the supporting structure as it conceals the appliance. The cover can be secured to a structural frame which also supports the appliance and can be adjusted in relationship to the structural frame to accommodate appliances of varying depths. A primary feature of the described mounting system is that the cover need not be removed during repositioning or operation of the appliance since the mount avoids interference with the cover.

Multiple embodiments are shown for accommodation to a variety of applications. One embodiment opens to allow a television display to be comfortably viewed while in bed by extending the TV over a reclining user. Another embodiment offers similar viewability but with a greater extension away from a supporting wall. Yet another embodiment provides for a TV to be concealed in, or against the surface of, a ceiling from which the TV may be dropped down away from the ceiling, inverted to expose the display, and then returned to contact with the ceiling while the TV is viewed from below. The latter embodiment may also be mounted on, or in, a wall for viewing from across a room. All embodiments provide for the TV to be easily returned to its concealed storage position. Each embodiment also has provision for concealment of power and control cables which may be routed from the TV to the wall or ceiling without concern of damage due to pinching or stretching.

Extended Flip-Out Model

Figure 2:
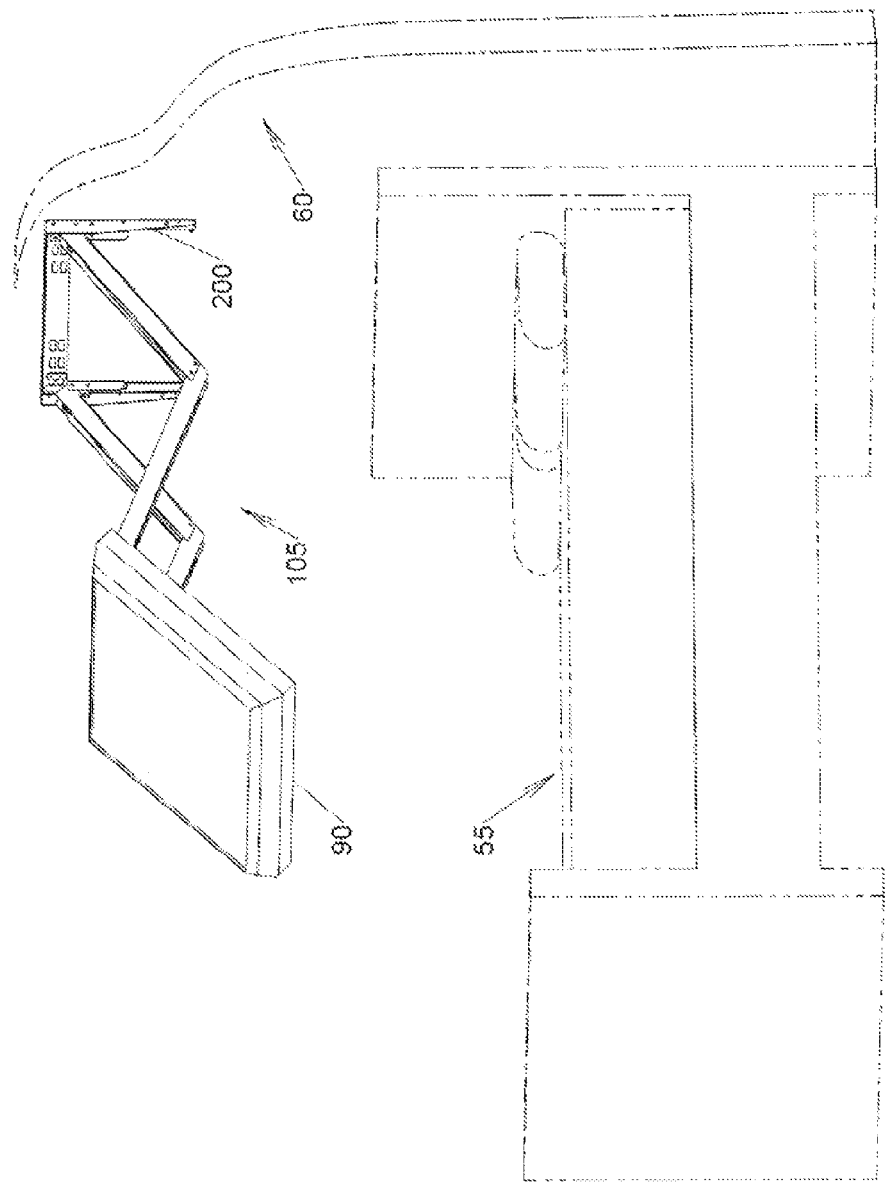
FIG. 2 shows a mounting system where the face of the appliance that was previously concealed against the wall is exposed to be viewed at its underside from a bed below.

Refer now to FIG. 1 for an overall perspective view of one application of the presently described mounting system. Here, a cover 90 conceals a flat-panel television that has been hung on a wall 60 above the headboard of a bed 55. In FIG. 2 the mounting system 100 has been extended away from the wall 60. This allows a person lying on the bed 55 to comfortably view the face of the television while the back of the TV remains concealed behind the cover 90. When the television is no longer in use, the user may easily return it to its closed, or stored, position where the face of the display is toward the wall 60 and is again concealed by cover 90.

Figure 3A:
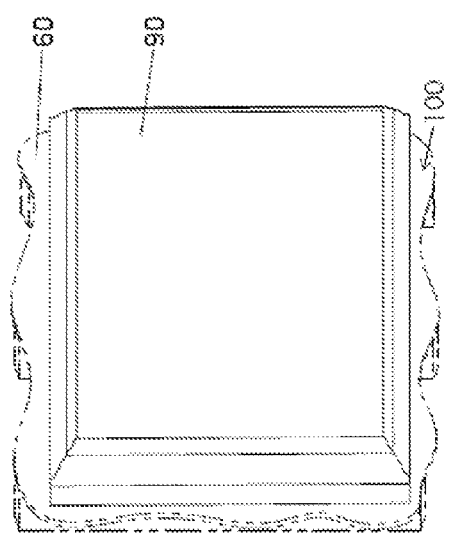
FIG. 3A shows a covered appliance concealed against a wall.
Figure 3B:
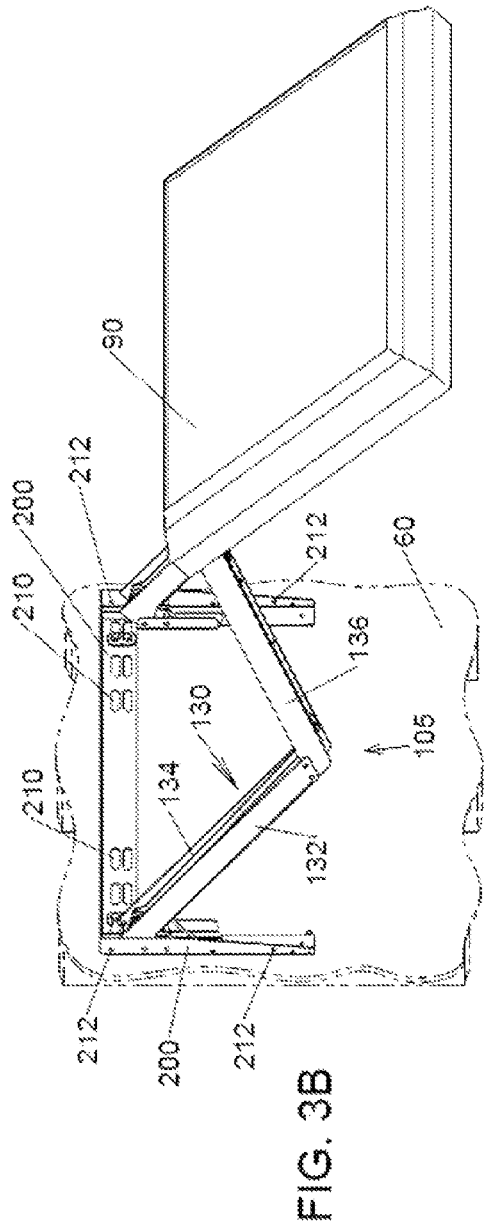
FIG. 3B is an isometric drawing of a mounting system that has been extended away from a wall with a cover in place to conceal the mounted appliance.

FIG. 3A again shows a mounting system 100, attached to a wall 60, in a closed position with the mounted appliance concealed behind a cover 90. In FIG. 3B a particular mounting system 105 has been extended to its opened condition as it would be for the viewing of a flat-panel display from beneath. It can be seen in FIG. 3B that the back side of the flat-panel display remains concealed by its aesthetic cover 90, which did not need to be removed for extension of the mounting system. Removal of the aesthetic cover 90 would reveal the back side of a flat-panel display and a variety of available options for routing of wiring between the display and the wall or other support structure.

In FIG. 3B the mounting bracket 200 is fastened to the surface of a supporting structure, such as a wall 60, by means of bolts or other fastening hardware through mounting apertures in the mounting bracket 200. The mounting apertures 210 are sized to allow adjustment of the fastening hardware in order to align the mounting bracket 200 with the supporting structure, such as to wall studs. It is to be noted that lag screws or other hardware which is compatible with the supporting structure can be substituted for what may be referred to here as bolts. It is also to be noted that the mounting bracket 200 may be mounted so that it is inset into a wall. For mounting between wall studs, for instance, screws or nails may be inserted through apertures 212 in the sides of the mounting bracket.

As the mounting system is described here, there is considerable space available for insertion of a separate enclosure within the area bounded by the mounting bracket 200. Such an enclosure could be mounted on the surface of the wall or into the wall cavity. It could contain electronics or serve as a storage alternative, including shelving, any of which could be treated with a suitably aesthetic cover. Also, provision could be made for installation of an interface that would include electrical outlets and audio-video connections. Accessory brackets could be used to support auxiliary electronics.

A first embodiment of the mounting system 105 uses a folding support arm 130 that is composed of two sections, an upper and a lower. Two lower support arm links 132 and 134 are pivotally attached to the mounting bracket 200 by suitable fasteners, respectively 131 and 133, better seen in the illustrations of FIG. 4. The link 134 is pivotally attached to another link 136 at pivot 135. The link 136 is also pivotally attached to the link 132 at pivot 137. The link 134 is pivotally attached to a link 138 at pivot 139. The link 138 is pivotally attached to the appliance interface bracket 300 at pivot 143. The link 136 is pivotally attached to the appliance interface bracket 300 at pivot 141.

As illustrated in FIGS. 4-8 both links 132 and 136 appear as solid arms that are able to conceal wires that are passed through them to the display. These figures illustrate the mechanical purpose while suggesting a method of also using the link to conceal wires; however, a non structural fitting can be fastened to one of the links to achieve the same function. As a force is applied to the mounting system, either at the link 132 or at the appliance interface bracket 300, the links 132 and 134 rotate counter-clockwise on their respective pivot points 131 and 133. As these links rotate counter-clockwise the link 138 is forced to rotate clockwise at pivot 135. As the link 134 rotates at pivot 135 it forces the link 136 to rotate the appliance interface bracket 300 in a counter-clockwise direction. In this configuration an operator would close the mounting system manually. In another embodiment, a lock and release mechanism assists the operator so that after the mounting system is partially closed manually the force of a uni-directional power source, such as a spring, engages to close the mounting system the remainder of the way.

When this mounting system 105 is closed, it appears from the front as in the view of FIG. 9 where the cover 90 is partially cut away. A sectioned side view shown in FIG. 10 reveals portions (133-135, 141, 143) of the tightly folded linkage system. In both figures it can be seen that the wiring 86 is routed along the linkage system as it is held in place by wire guides 88.

Figure 12:
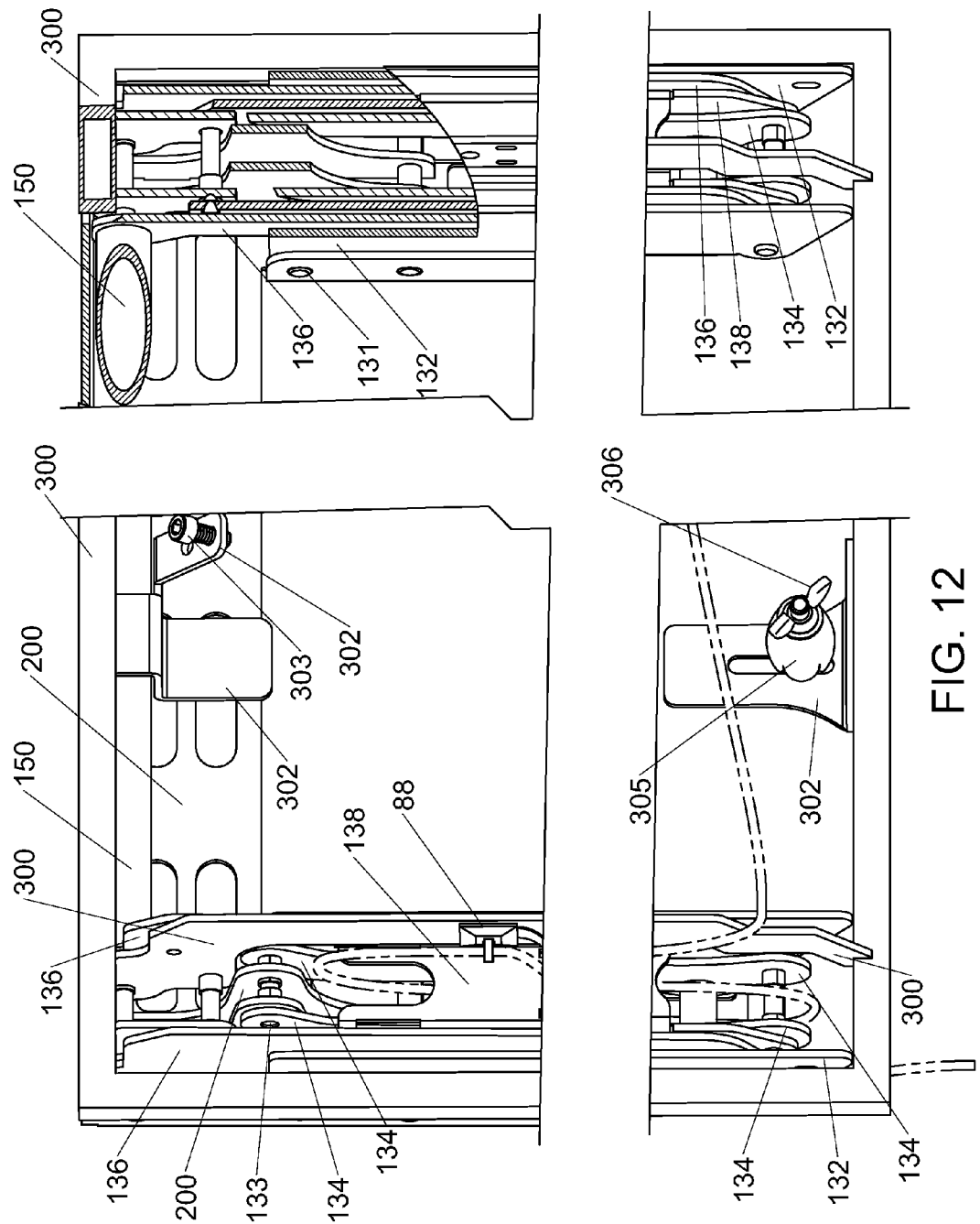
FIG. 12 is an isometric view of the mounting system of FIG. 9.

A very important feature of the presently described mounting systems is the stabilizer 150 shown in FIGS. 9, 10 and 12. In any mounting system 100 that has more than one support arm it is necessary to synchronize the motion between the arms to avoid twisting and binding as the appliance is moved from one position to another. The rigid stabilizer 150 in the present mounting system 105 is rigidly connected to the first link 136 of each upper support arm. In this manner the link at each end of the stabilizer 150 is forced to rotate at the same angular rate as its partner at the other end.

FIG. 11 shows a detail of a spring-loaded plunger ball pin 222 that is mounted on the appliance interface bracket 300. This plunger ball pin 222 is positioned such that its ball will engage a small hole, serving as a detent 224, in this case, in the first link of the lower support arm 132. This provides sufficient resistance to hold the mounting system 105 in its closed position. Plunger ball pins may also be used to provide a snap fit that is easily removable to hold a cover 90 in place on an appliance interface bracket 300.

The isometric face view of FIG. 12 shows miscellaneous features of the presently described mounting system 105. Power and control wiring 86 is held in place by a variety of wire guides 88 as the wiring is routed along the length of the support arms back to the support structure. The wire guides 88 may be implemented as cable ties, clamps or other components commonly used for such purposes.

Most appliances provide some sort of an attachment base for a secure mount to a support structure. In the case of a television, most manufacturers provide for insertion of mounting screws to the backside of the appliance. However, television sets are not generally intended to be mounted for operation in an inverted position, and are even less likely to be intended to be flipped bottom over top. For these reasons, the presently described mounting systems do not rely on threaded inserts and similar provisions that are sometimes built into the attachment base of TVs.

Figure 13:
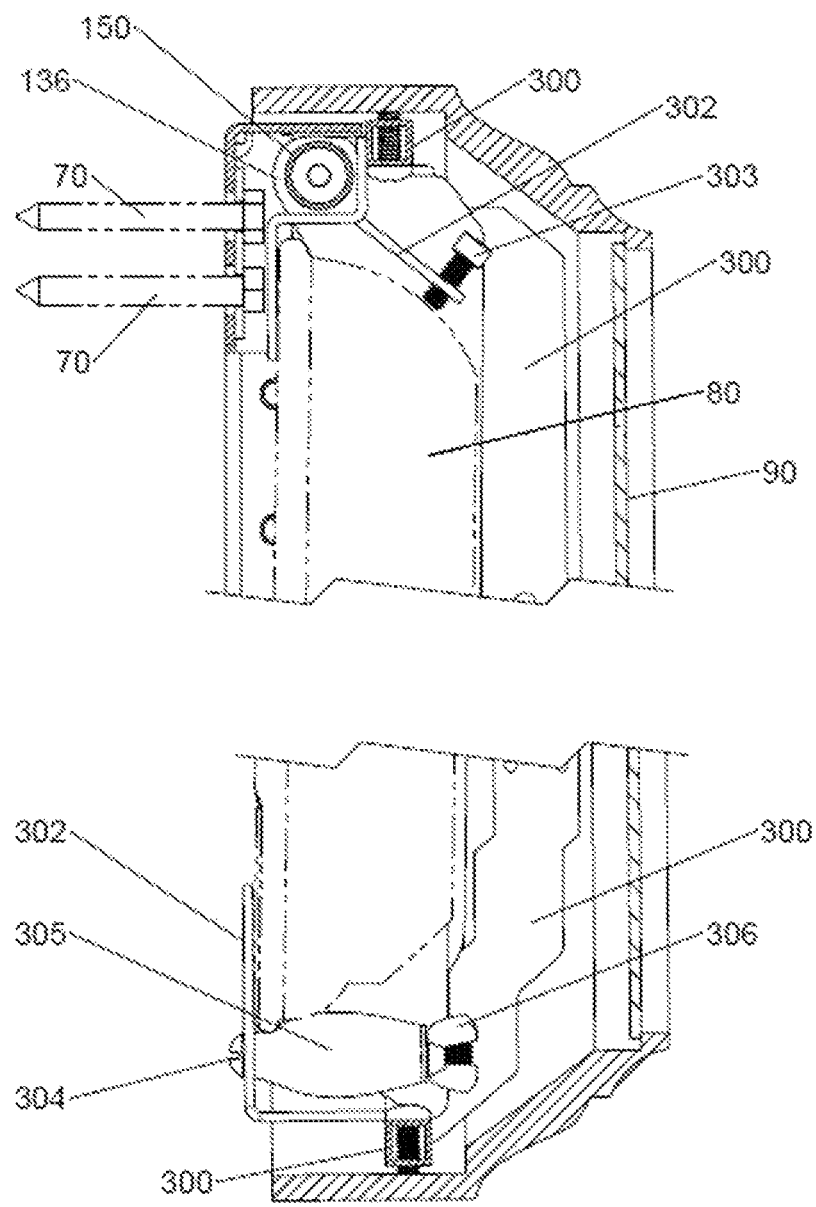
FIG. 13 illustrates methods of mounting an appliance to an appliance interface bracket.

The appliance 80 may be held in place by a variety of means. Shown at the top of FIG. 12 with a side view in FIG. 13 is a mounting screw 303 which has been installed into a mounting tab 302 to an extent at which it firmly engages the appliance 80 without so much force as to cause damage. Mounting tabs 302 are conveniently placed around the perimeter of the appliance interface bracket 300 to provide support for appliances 80 of various sizes.

At the bottom of FIG. 12 and FIG. 13 is shown in alternate means of mounting an appliance 300. In this case a mounting screw 304 is inserted through a slot in the appliance interface bracket 300. A resilient mount 305 is slid over the mounting screw 304 and engaged by a wing nut 306. The wing nut 306 is tightened to compress the resilient mount 305 sufficiently to hold it in place while providing a firm but resilient support to hold the appliance 80 in place.

The use of a folding support arm constructed from two sections offers an advantage of greater extension of the display from the wall than support arms having only a single section. Additionally, adjustments within the linkage system enable it to extend to a wide range of angles when in its opened position to meet the needs of a variety of applications. Furthermore, the folding support arms enable counterbalancing of forces in order to minimize the force required to open or close the mounted display.

Figure 4:
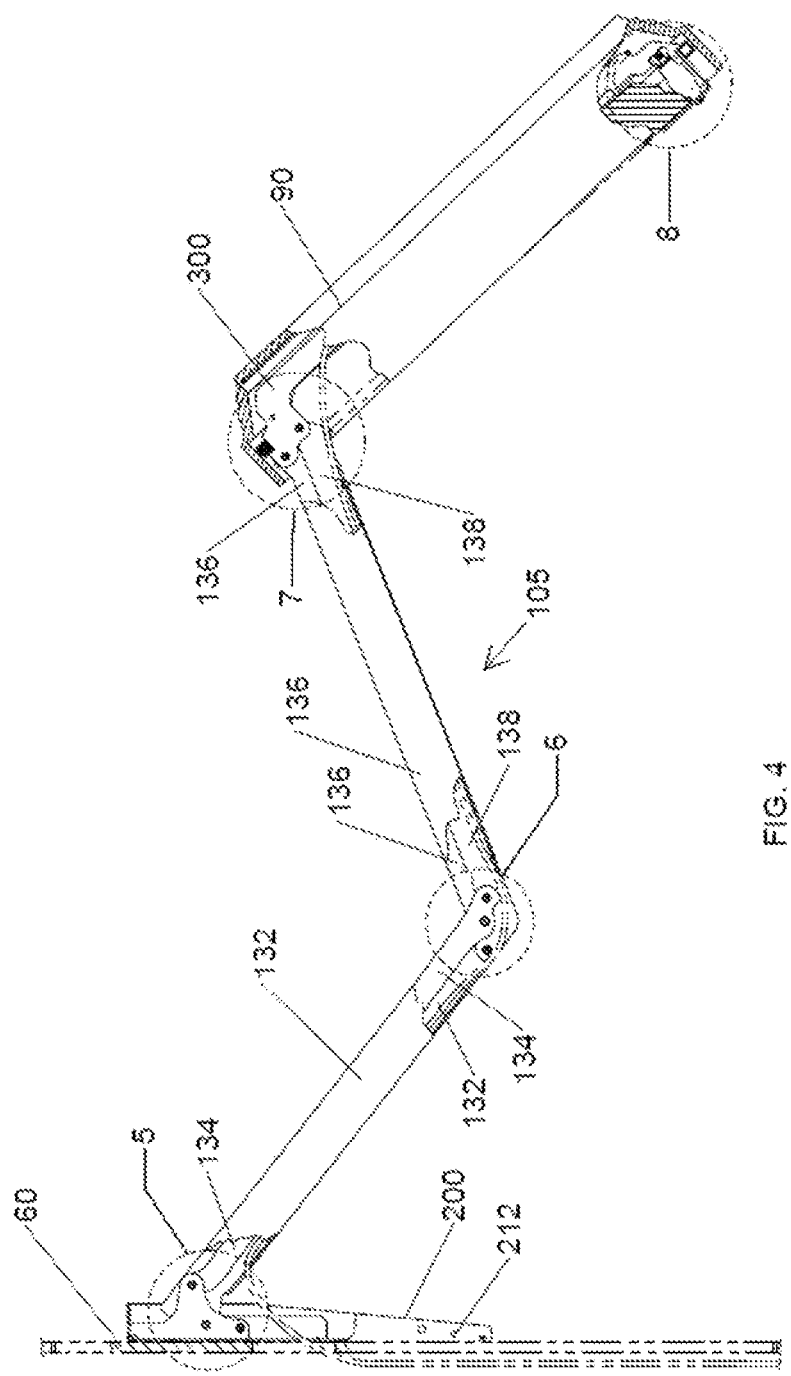
FIG. 4 shows the mounting system of FIG. 3B in cross-section with details in FIGS. 5-8.
Figure 8:
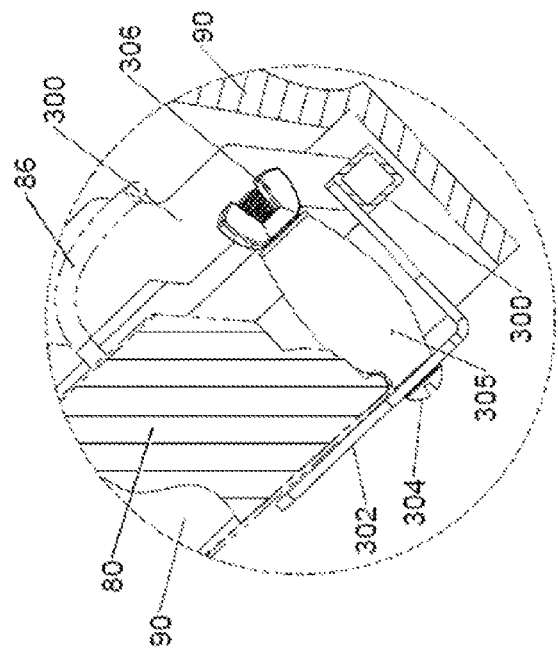
Figure 7:
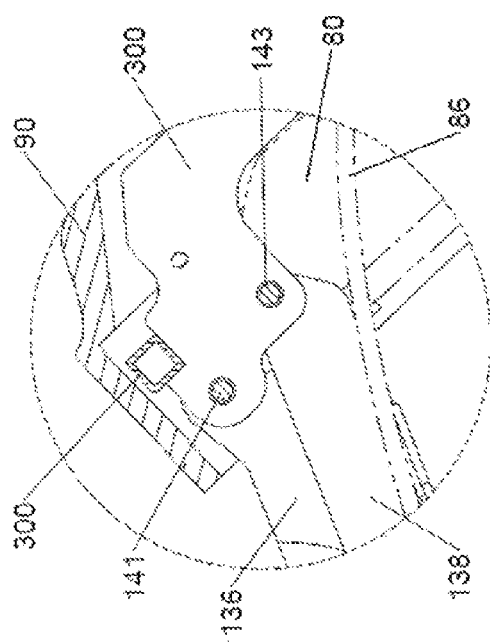

Shortening the length of the links 132 and 134 of FIG. 4 will result in a shorter extension of the appliance from the wall, in this case, or other fixed support structure. Shorter links 132 and 134 allow the upper pivot points 131 and 133 to be moved lower on the mounting bracket 200, if so desired. However, longer links with pivot points placed higher on the mounting bracket 200 provide for longer extensions while offering the advantage that the vertical extent of the mounting bracket may be reduced.

Whereas this embodiment of the mounting system has been described with left and right support arms, an alternate version allows for reduction to a single central arm. To accommodate a central arm requires modification to elongate the upper portion of the mounting bracket 200 in order to extend it away from the wall. This is necessary to provide clearance behind the flat-panel display when in the mounting system is in its closed position.

Flip-Out Model

Figure 14:
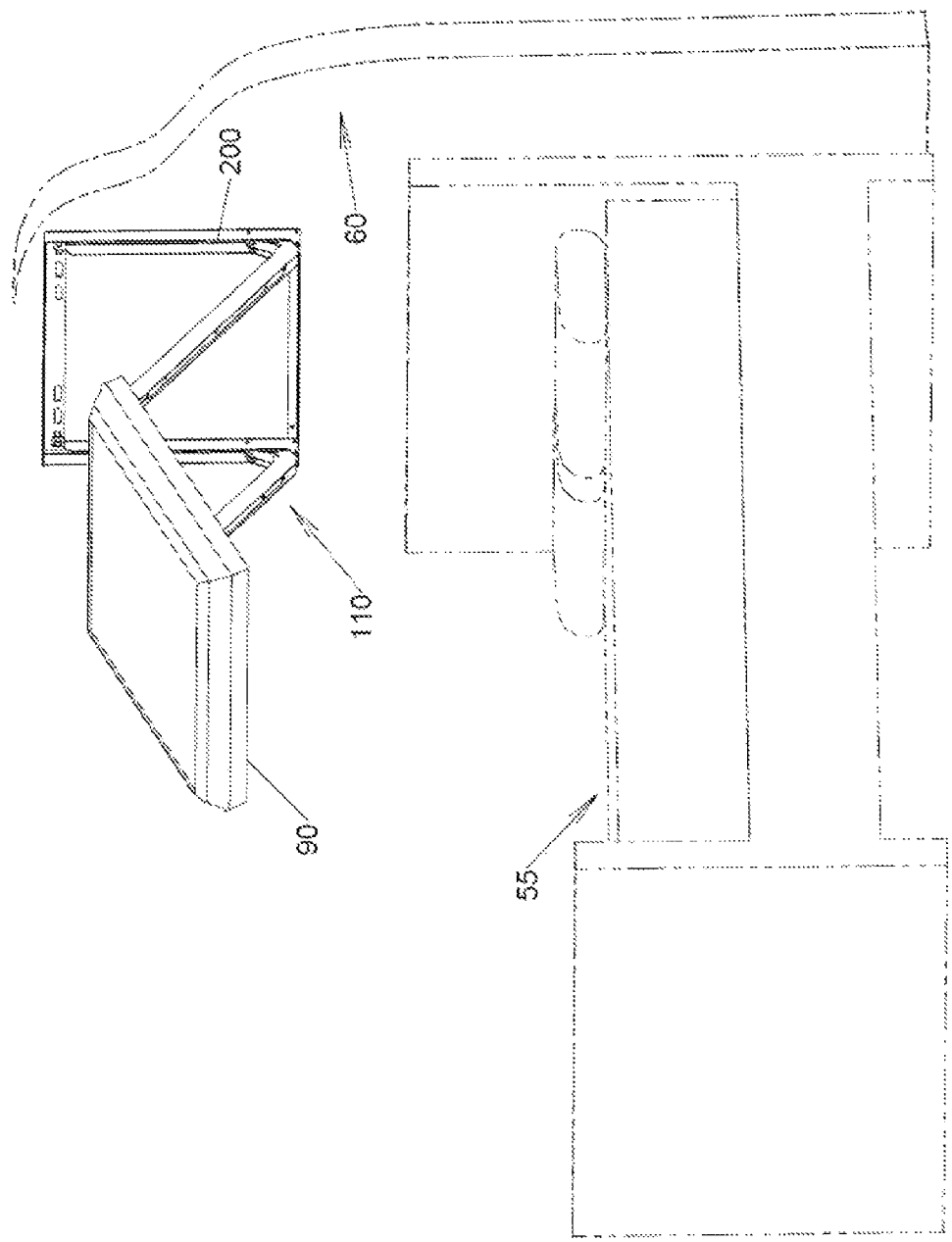
FIG. 14 is an isometric drawing of an alternate mounting system that has been extended away from a wall to allow viewing of the face of the mounted appliance from a bed below while the back of the appliance remains covered.
Figure 15B:
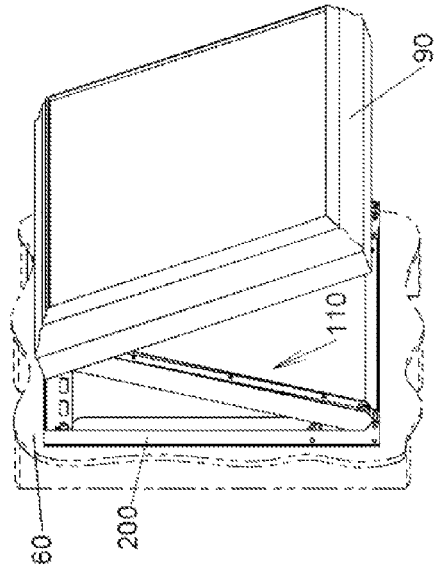
FIG. 15A-C is a series of isometric drawings showing a mounting system which attaches a covered appliance to a wall in FIG. 15A, and is partially extended in FIG. 15B.
Figure 15A:
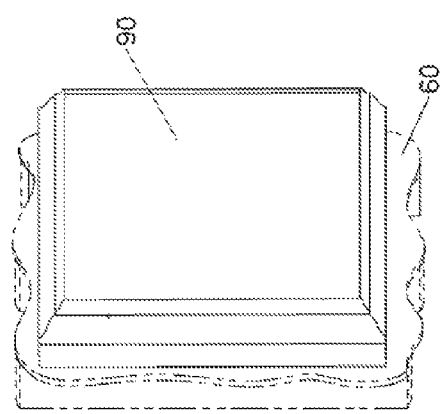
Figure 15C:
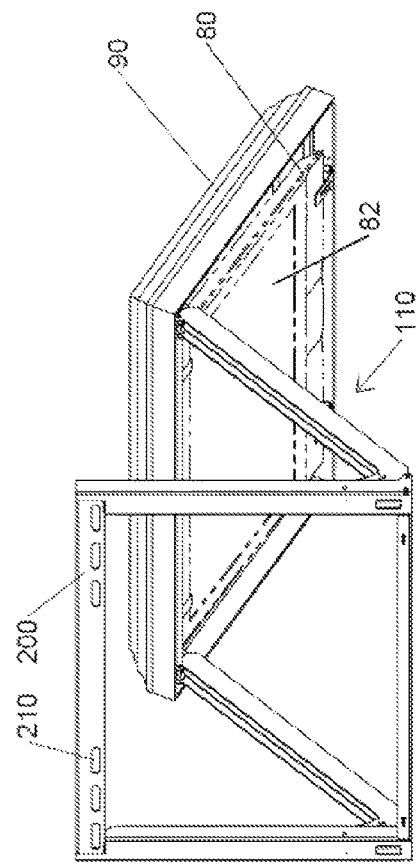

Another embodiment 110 of the mounting system 100 is shown beginning with FIG. 14 using a support arm constructed from a single linkage. Here, the display has been extended with its cover 90 intact for viewing of the display by a person lying on the bed below. FIG. 15A shows the mounting system attached to a wall 60 with the mounted appliance hidden by a cover 90. A partial opening, as in FIG. 15B, reveals the mounting system 110 which supports the covered appliance. Viewing the mounting system 110 in its extended condition (FIG. 15C) from behind the wall 60 allows one to see the face 82 of the mounted appliance 80, the back side of which remains hidden by the cover 90.

In this instance the mounting bracket 200 has four sides and is slightly smaller than the frame of the appliance interface bracket 300. This allows the mounting bracket 200 to fit inside the appliance interface bracket 300 when the mounting system 110 is in the closed position. The large size of the mounting bracket 200 provides many options for mounting of the power source, mechanisms, and wires while allowing them to be easily concealed when the mounting system 110 is in the open position. The large mounting bracket 200 also allows hardware for mounting to the wall 60, or other support structure, to be installed at the extremes of the bracket which reduces the stress that is applied to the hardware when the mounting system 110 is in the opened position.

Figure 16:
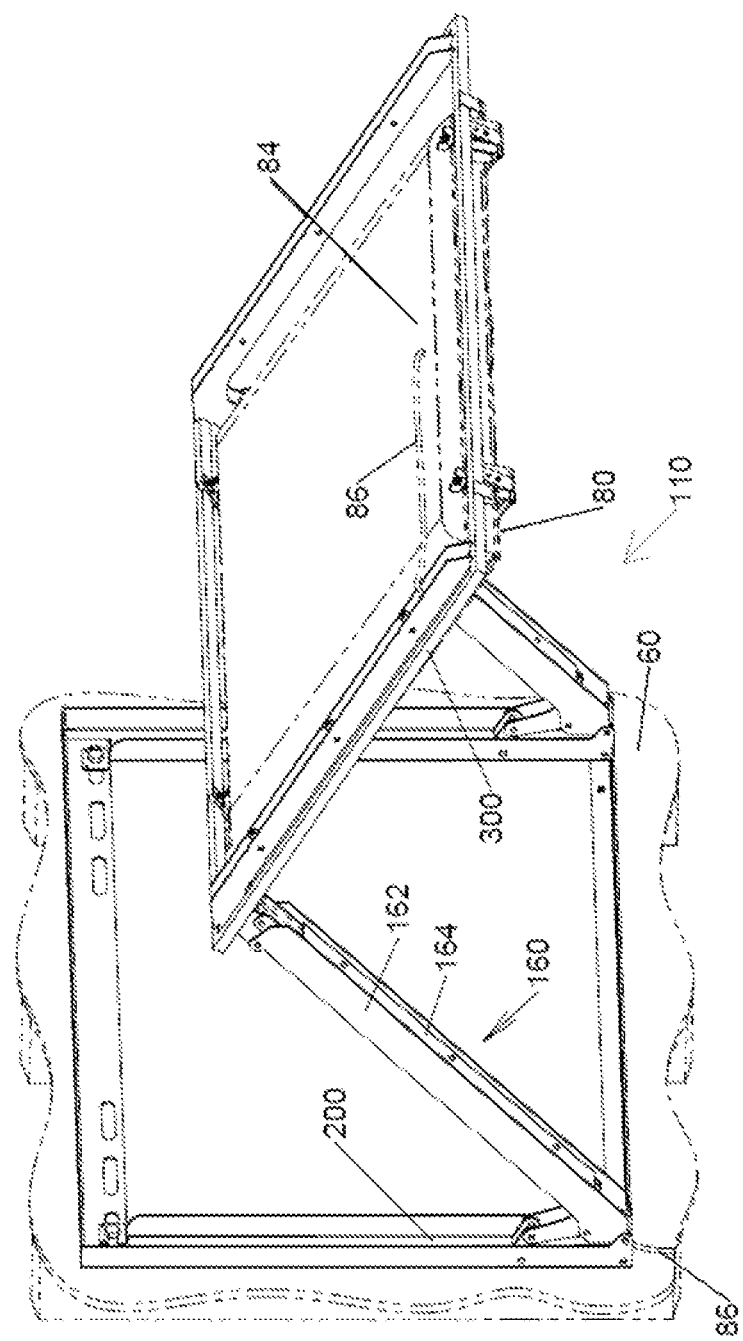
FIG. 16 is an isometric view of an extended mounting system in which the cover has been removed from the backside of the appliance.

Although the configuration of the support arm 160 in FIG. 16 and following does not extend the display, or other appliance, as far as other configurations, it has advantages with regard to simplicity and stability. It also provides opposing forces at two pivot points to minimize the force that must be applied by a power source or a user to open or close the mounting system 110. Furthermore, it is to be noted that a single support arm 160, rather than the pair of support arms shown here, is capable of supporting a covered flat-panel display 80 as it is extended from a wall 60.

Details of this mounting system 110 are shown in FIGS. 17-22. The first link 162 of rigid support arm 160 is pivotally attached to the mounting bracket 200 at pivot 161 (FIGS. 18, 22) and to the frame of the appliance interface bracket 300 at pivot 171. A second link 164 is pivotally connected to the appliance interface bracket 300 by a pivot pin at a pivot 163 (FIGS. 19, 21). An angled link 166 (FIGS. 18, 22) pivotally connects to the first link 162 at pivot 165 and to the second link 164 at pivot 167. The short link 168 is pivotally attached to the mounting bracket 200 at pivot 170, and to the angled link 166 at pivot point 169.

To move the mounting system 110 from a closed position to an open position, outward force is applied to urge the lower portion of the appliance interface bracket 300 away from the lower portion of the mounting bracket 200 which is attached to the wall 60. This pressure at the lower portion of the appliance interface bracket 300 causes a counter-clockwise rotation (in FIGS. 19, 21) of pivot pin 163 around the pin 171 near the opposite edge of the appliance interface bracket. Since pivot pin 171 is rigidly connected to pivot pin 161 through the first link 162 of support arm 160, the movement of pivot pin 163 is transferred through the rigid second link 164 of the support arm 160 which exerts upward pressure on the pivot pin 167. This action causes a counter-clockwise rotation (FIGS. 18, 22) of the angled link 166 about its connection to the first link 162 at pivot 165. That rotation in turn transfers to draw pivot pin 169 downward as it causes the short link 168 of support arm 160 to rotate clockwise about its pivot at 170. In summary, as the appliance interface bracket 300 is pulled slightly away from the mounting bracket 200, the former rotates counter-clockwise, support arm 160 rotates clockwise, and the angled link 166 rotates counter-clockwise against the short link 168 which rotates clockwise. With appropriate selection of the relative lengths of the links, the result is that a horizontal centerline of the appliance interface bracket 300 moves in a horizontal plane away from the mounting bracket 200 while rotating its flat-panel display 80 payload about that centerline.

Figure 17:
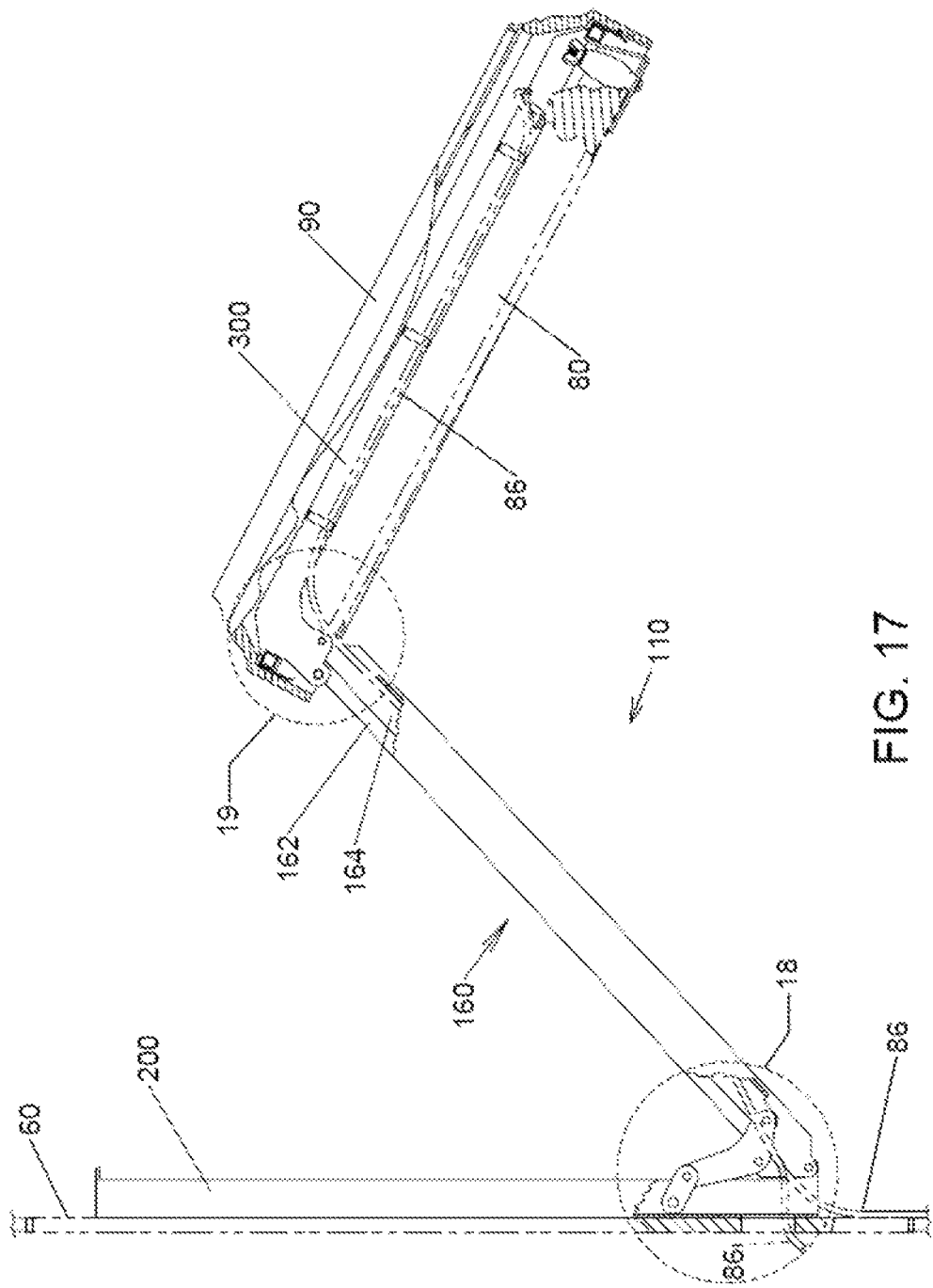
FIG. 17 is a cross-section view of an extended mounting system supporting a covered appliance with details shown in FIGS. 18-19.

The forces just described are sufficiently balanced that a slight modification to the implementation of FIGS. 17-19 allows for a manual version that requires very little force and may be used with a remotely controlled motor. Extending the short link 168 beyond its pivot 170 creates a lever arm which can be driven by a motor or other suitable power source. For example, in a sequence of actions that is the reverse of those described immediately above, a gas spring can be pivotally attached between a fixed point on the mounting bracket 200 and a pivot pin on the extension of the short link 168.

As the gas spring applies downward force to the extension of the short link 168, it causes that link to rotate around pivot pin 165 which is fastened to the mounting bracket 200. The short link 168 is pivotally attached to the angled link 166 at pivot 169. As the short link 168 rotates counter-clockwise it pulls up on the angled link 166 which pivotally connects to the first link 162 of support arm 160 at pivot 165 and to a second link 164 at pivot 167. The first link 162 is pivotally attached to the mounting bracket 200 by a pin at pivot 161 allowing it to pivot outward as the angled link 166 is forced upward. As the first link 162 of support arm 160 rotates outward it forces the angled link 166 to rotate on a pivot pin 169 connected to the first link 162. This rotation of the angled link 166 causes a second link 164 to extend. As the second link 164 extends it forces the appliance interface bracket 300 which houses the flat-panel display 80 to rotate outward around the pivot pin 171 which connects the appliance interface bracket 300 and the first link 162 of the support arm 160.

Construction of the support arm 160 using channel stock for the first link 162 provides a space in which to house the second link 164 and to conceal the power and control cables that must be connected to the flat-panel display 80. As shown in FIGS. 23-24, the mounting system 110 has a pair of support arms 160, applied at each of the left and right sides of the appliance interface bracket 300. In order to cause these support arms 160 to move synchronously, that is, in unison, with one another, a rigid stabilizer 150 is rigidly attached at its ends to the first link 162 of each of the support arms 160. This causes each of the first links 162 to rotate at the same angular rate which keeps one arm from leading or lagging the other which would cause the mounting system 110 to bind.

FIGS. 23-24 show a mounting system 110 in which a gas spring 192 has been installed to assist with opening and closing of the system. The cross-section view of FIG. 23 shows the gas spring 192 pivotally connected at its upper end 191 to the mounting bracket 200 and at its lower end 193 to the appliance interface bracket 300. The gas spring 192, or an equivalent mechanical power source, can be positioned so that it holds the mounting system 110 closed until the appliance interface bracket 300 is pulled out by a user to a point where the force of the gas spring 192 acts to increase the angle between the appliance interface bracket 300 and the support arm 160 to cause the mounting system 110 to open to a predetermined position.

Alternately, the gas spring 192 can be positioned so that its force is used to expand the mount from its fully closed position without requiring an initial urging from a user. In this case a latch 220 (shown at the bottom of FIG. 23) can be used to hold the mounting system 110 in the closed position. When a user releases the latch the gas spring 192 will cause the mounting system 110 to extend to a predetermined position.

Figure 26:
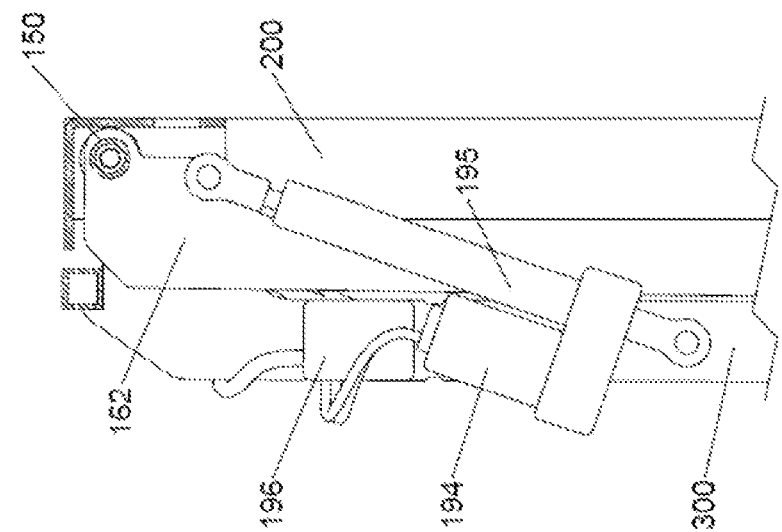
FIGS. 25-26 are plan and side views, respectively, of a motorized mechanism for opening and closing the mounting system.
Figure 25:
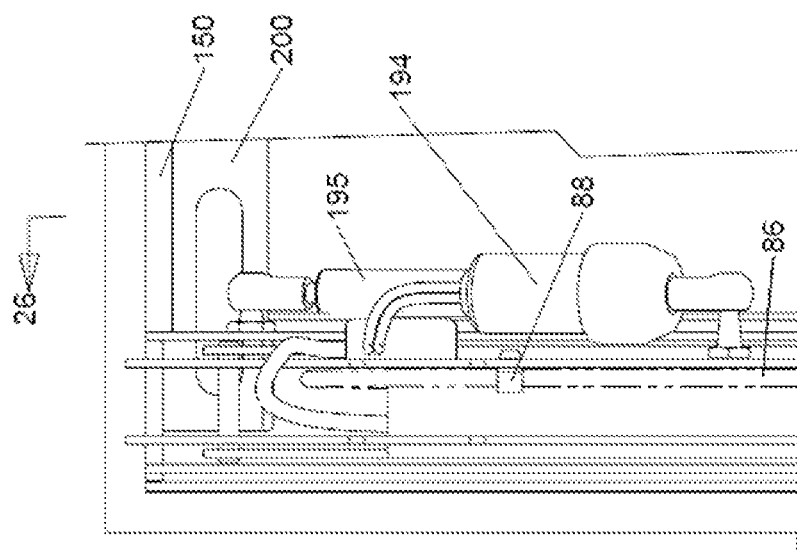

Replacing the gas spring of FIGS. 23-24 with a motor 194, as in FIGS. 25-26, enables remote control of the mounting system 110 either wired or wireless. The motor control 196 may be a wireless receiver to support a wireless remote control, or it may be a relay system controlled remotely through a wired connection. With a motor-driven linear actuator 195 attached between the mounting bracket 200 and the appliance interface bracket 300, the arm of the linear actuator acts to open and close the mount by expanding and contracting. The linear actuator can be installed across any joint or pivot where the angle between the two adjacent components changes. It may be desirable to include limiter switches to automatically stop the motor 194 at predetermined positions of the mounting system 110.

The mounting bracket 200 is fastened to the wall 60 or other support structure by hardware fastening means such as lag screws or bolts which are mounted through channels cut out of the mounting bracket 200.

The flat-panel display 80, or other appliance, is mounted to the appliance interface bracket 300 by means of adjustable brackets which have holes and channels to accept screws which fasten the display 80 to the adjustable bracket. The adjustable bracket is made adjustable by a guide or track system which allows the brackets to move laterally.

An aesthetic cover 90 such as a picture frame can be mounted to the face of the appliance interface bracket 300 through means of a fastening system that allows the cover 90 to be installed and removed without requiring access from the back side. There are multiple suitable methods, one of which is a slot and screw. A cover 90 can also be mounted to conceal the sides of the appliance interface bracket 300 and/or the mounting bracket 200 if desired. It is to be noted that the mounting bracket 200 may be truncated somewhat above its connection with the pivot 170, since with sufficiently secure mounting to the support structure, this portion of the bracket is unnecessary.

Figure 27A:
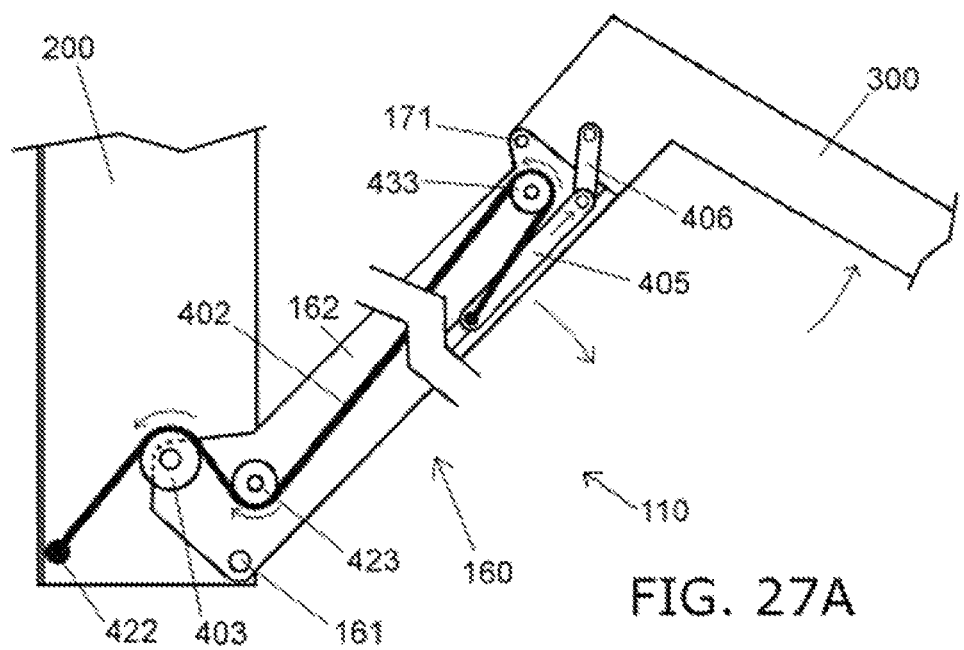
FIGS. 27A-H depict a variety of linkage mechanisms that may be used in a mounting system.

There are many different component and mechanical arrangements that may be applied to develop the linkage support arms that are described here. FIG. 27A shows a cross sectional view of one such arrangement. As the support arm 160 rotates clockwise, a cable 402, secured to the mounting bracket 200 at terminal 422, is drawn through the pulleys 403, 423, and 433 which are mounted to the first link 162 of support arm 160. The other end of the cable 402 is attached to a linear slide 405 which is also attached to the first link 162 of support arm 160 and guides the slide 405 upward as the support arm 404 rotates outward. The linear slide 405 is attached to the appliance interface bracket 300 by a link 406 which forces the appliance interface bracket 300 outward and upward. Having shown this arrangement, it will be recognized by those skilled in the art that the number and size of the pulleys as well as the layout of the cable can be modified to provide more or less extension as a result of variations in ratios of movement and power transfer from rotations about pivot 161 and pivot 171.

Figure 27B:
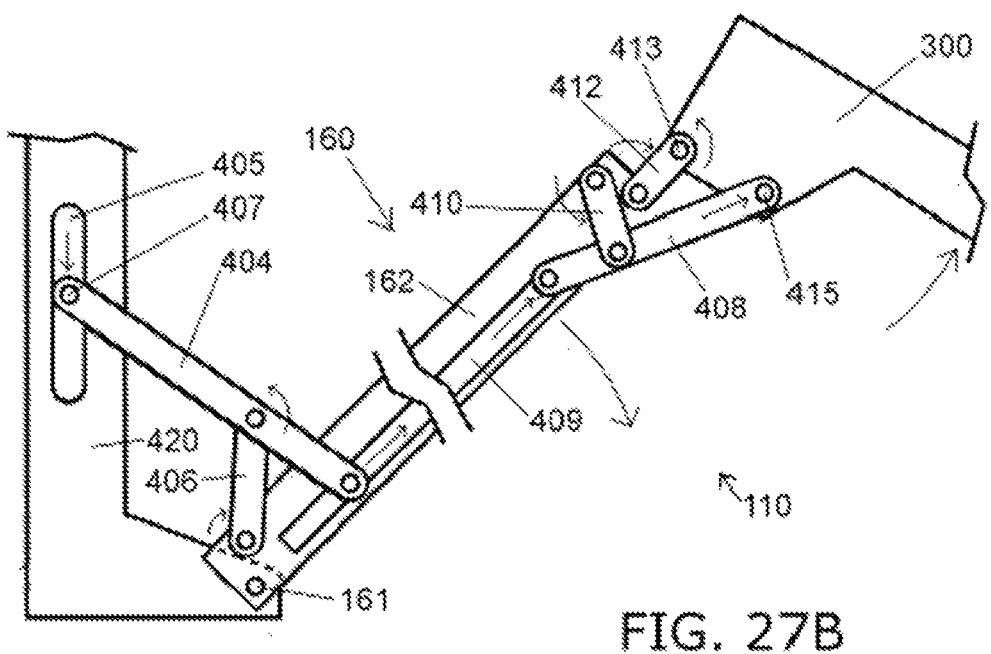

In FIG. 27B a link 404 is attached to the mounting bracket 200 through a slide 405 and bearing 407. The link 404 pivots on link 406 and transfers force to a slide 407. The link 404 pivots on the first link 162 of support arm 160, which in turn pivots on a support bracket 420 which is fastened to the mounting bracket 200. A link 408 is attached to the slide 409 which transfers force to the appliance interface bracket 300. The link 408 pivots on link 410 which pivots on the first link 162 to control movement of the link 408. A link 412 attaches the first link 162 to the appliance interface bracket 300 at two pivot points (413, 415) and acts to allow extra extension of the mounting system 110.

Figure 27C:
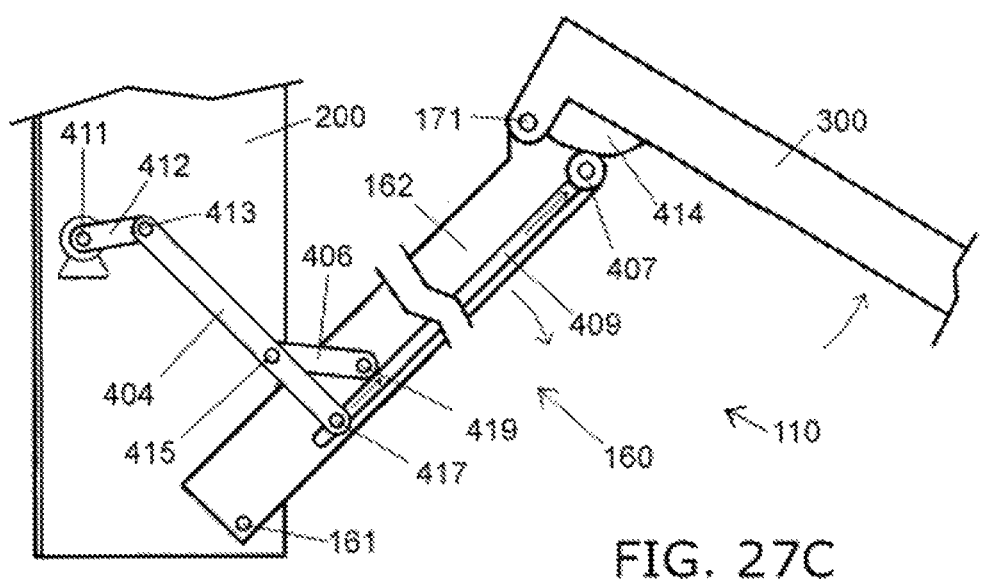

Move now to FIG. 27C where a link 412 is pivotally attached to the mounting bracket 200 at pivot 411 and to a link 404 at pivot 413. The link 404 is pivotally attached to a link 406 at pivot 415 and to a slide 409 at pivot 417. The link 406 is pivotally attached to the first link 162 of support arm 160 which is pivotally attached to the mounting bracket 200 at pivot 161. The slide 409 is attached but allowed to move linearly along the length of the support arm 160. A bearing 407 is fastened to the slide 409 and interacts with a track 414 mounted to the appliance interface bracket 300. The bearing 407 acts as a wheel rolling around the track 414. The support arm 160 is pivotally attached to the appliance interface bracket 300 at pivot 171. As the support arm 160 rotates outward, the system of linkages shown here transfer power to the slide 409. This motion in turn transfers force to the appliance interface bracket 300 through the bearing 407 mounted on the slide 409 which rolls along a curved track 414 that is attached to the appliance interface bracket 300 causing it to move outward. A power source in the form of a spring or a motor could be applied at multiple points to facilitate movement.

Figure 27D:
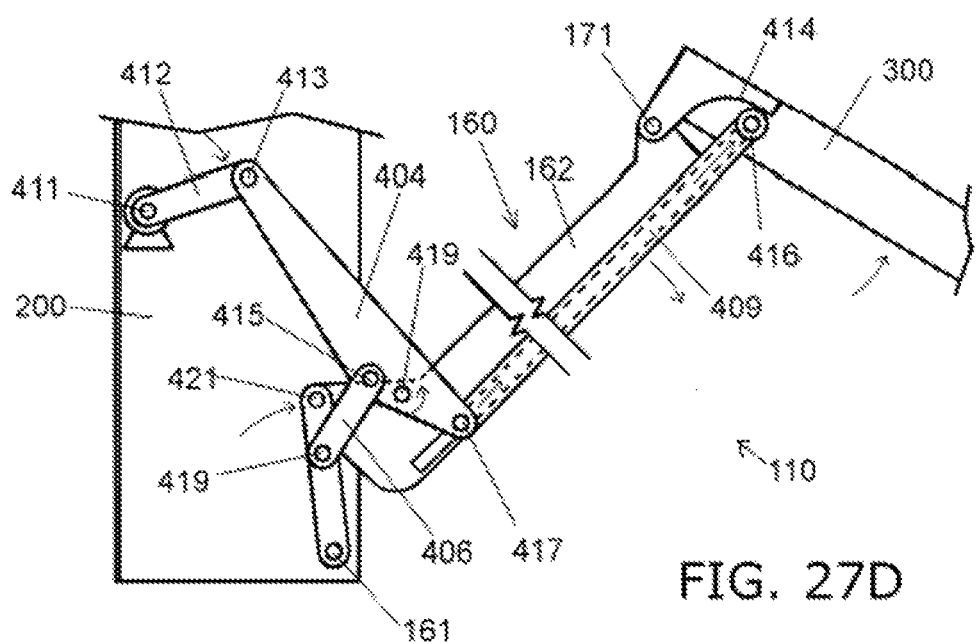

Another variation of a linkage system is shown in FIG. 27D. A link 412 is pivotally attached to the mounting bracket 200 at pivot 411 and to a link 404 at pivot 413. The link 404 is pivotally attached at several points, including to a link 406 at pivot 415, to a slide 409 at pivot 417, and to the first link 162 of support arm 160 through pivot 419. The link 406 is pivotally attached to a link 424 at pivot 419. The link 424 is pivotally attached to the mounting bracket 200 and to the first link 162. A bearing 416 is attached to the slide 409 which is attached to the support arm 160 and is allowed to move linearly along its length. The bearing 416 makes contact with a track 414 which is mounted to the appliance interface bracket 300 which is pivotally connected to the support arm 160 at pivot 171. As the support arm 160 rotates outward, the system of linkages allows extra extension of the support arm 160 outward and upward. The bearing 416 allows the force to be transferred to rotate the appliance interface bracket around the pivot 171.

Figure 27E:
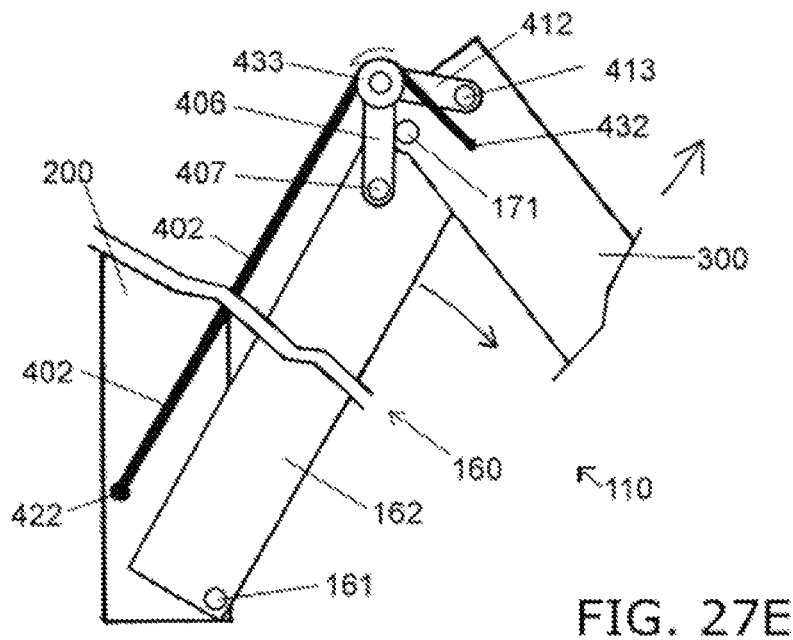

A cable 402 is attached to the mounting bracket 200 at terminal 422 in FIG. 27E. After routing around a pulling 433, the cable 402 attaches to the appliance interface bracket 300 at terminal 432. The pulley 433 is mounted on two links 406 and 412. The link 406 is pivotally attached to the support arm 160 at first link 162 which is pivotally attached to the mounting bracket 200. The link 412 is pivotally attached to the appliance interface bracket 300 at pivot 413. As the mounting system 110 opens, the links 406 and 412 extend the pulley 433 out away from the joint at pivot 171 which pivotally connects the support arm 162 to the appliance interface bracket 300. As the support arm 160 rotates outward, the appliance interface bracket 300 is forced to rotate as well, driven by the cable 402. As the angle between the support arm 160 and the appliance interface bracket 300 increases, the pulley 433 mounted to links 406 and 412 extends out away from the rotating joint at pivot 171 to change the ratio of rotation and force.

Figure 27F:
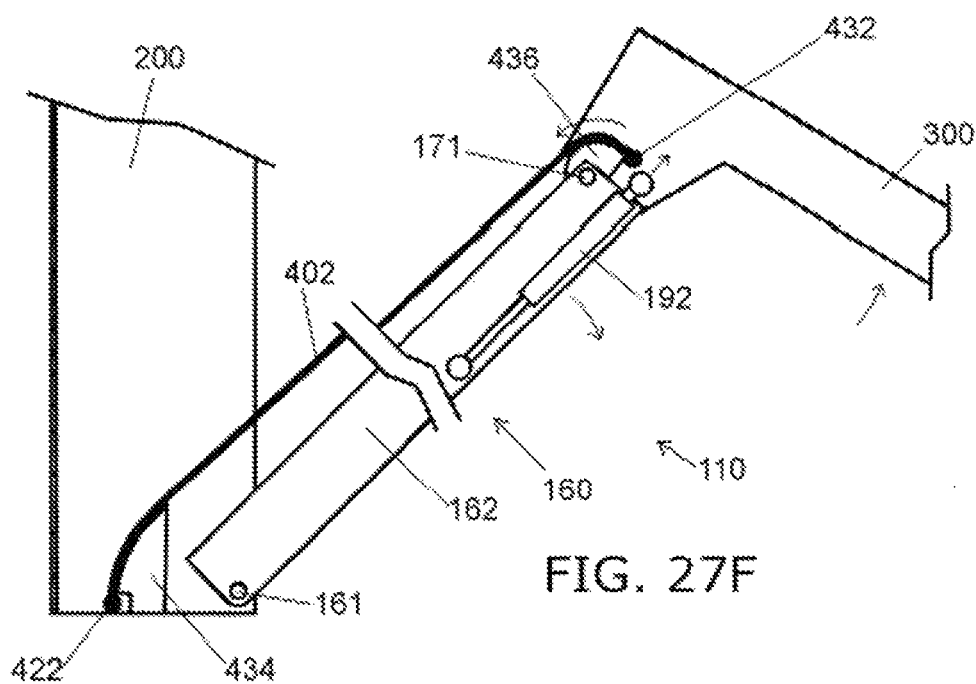

Shown in FIG. 27F is another linkage which uses a cable. One skilled in the art of linkages will recognize that, depending upon the given application, a cable can be replaced by a wire rope or chain. The support arm 160 is pivotally attached to the mounting bracket 200 and appliance interface bracket 300. A cable 402 is attached to the mounting bracket 200 at terminal 422. As the mounting system 110 opens, the cable 402 is guided along a first curved guide 434 which is attached to the mounting bracket 200 and a along a second curved guide 436 that is attached to the appliance interface bracket 300. As the support arm 160 rotates, the appliance interface bracket 300 is forced by the cable 402 to rotate in the opposing direction. The inclusion of a gas spring 192 in FIG. 27F illustrates one example where a power source may be placed to balance a specific load to ease the opening and closing operations of the mounting system 110.

Figure 27G:
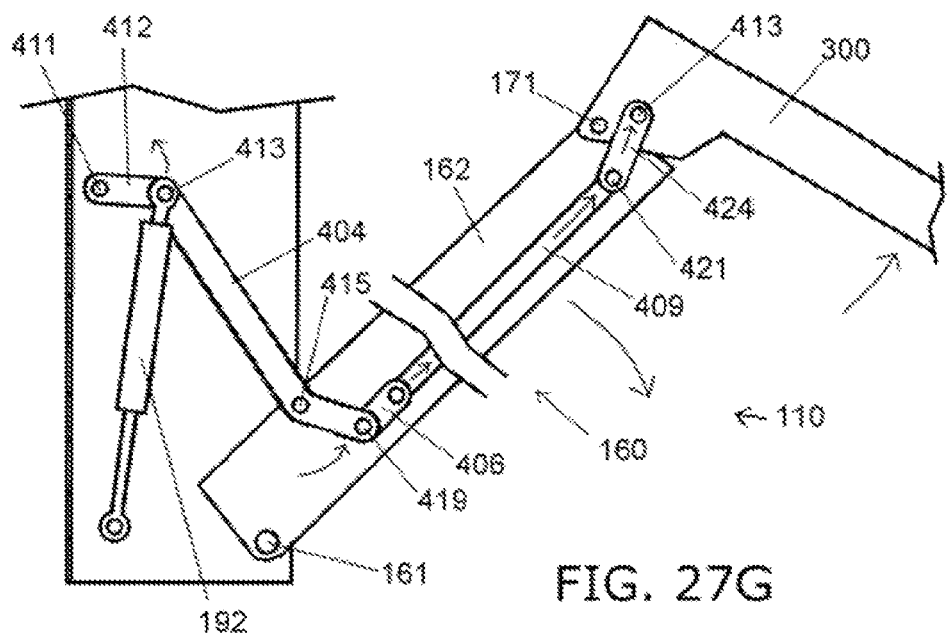

The force created as the mounting system 110 opens in FIG. 27G is transferred through a system of links. A link 412 is pivotally attached to the mounting bracket 200 at pivot 411 and two a link 404 at pivot 413. A gas spring 192, or other power source, is pivotally connected to the mounting bracket 200 and also to the link 412 at two 413. Link 404 is pivotally connected to the support are 160 at pivot 415 and to a link 406 at pivot 419. The link 406 is connected to a slide 409 which is attached to the first link 162 of support arm 160. The slide 409 is pivotally attached to a link 424 at pivot 421 which pivotally attaches to the appliance interface bracket 300 at pivot 413. Shown in this illustration is a gas spring 192, however, it will be noted that selection of a particular type of power source and its placement can be used to good effect in other locations and for many of the configurations illustrated in this set of FIG. 27.

Figure 27H:
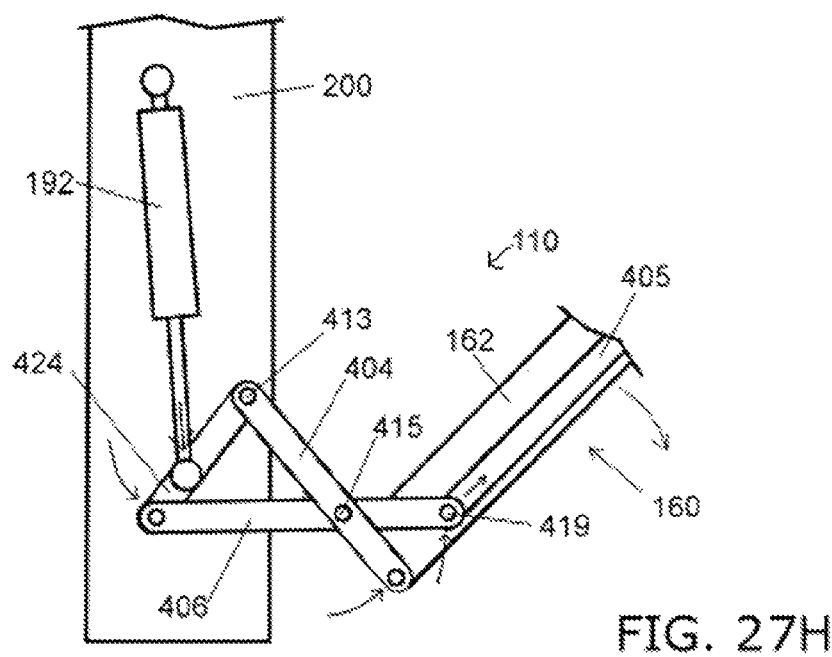

FIG. 27H shows another of the many systems of links that can be used to transfer force while also further extending the opened position of the mounting system. The links 404 and 406 are pivotally joined at pivot 413 and pivot on one another. Pivot 413 is mounted on the mounting bracket 200. A power source 192 can be used to operate the mechanism. The link 404 is attached to the support are 160 and causes it to extend as the mounting system 110 opens. The link 406 is attached to a slide or alternative link 405.

Flip-Around Model

Shown in FIGS. 28A-C is another embodiment in the form of a mounting system 115 that allows an appliance to be rotated a full 180° without encountering interference. In order to avoid interference, it is necessary for this four-bar linkage to be of such length, and with link arms that are properly contoured, so that during its rotation the bottom of an attached TV must clear the wall or other support structure.

When viewed in its closed position, as in FIG. 28A, the mounting system and its load are completely hidden against a support structure, such as a wall 60, by the cover 90, which may be a framed picture, a mirror or other aesthetically pleasing wall hanging. In FIG. 28B the covered appliance has been folded out from the support surface into nearly a 90° rotation to reveal the wall-hung mounting system. An additional rotation to a full 180° from its original covered position reveals in FIG. 28C the formerly concealed face 82 of the appliance 80 as the aesthetic cover 90 has been moved to be flush against the support surface 60.

It will be noted that when this type of mounting system 115 is in its fully opened position, following a rotation of a full 180° from its closed position, the cover 90 must provide clearance for the support arms 180. One means of clearance is to cut slots into the cover 90, but such slots would be open to the top when the mounting system 115 is in the closed position. Another approach is to provide for a portion of the upper region of the cover 90 (when in the closed position) to be hinged. In this manner, the hinged portion would drop clear of the support arms 180 as the mounting system 115 transitions to its opened position and return to a concealing condition as the mounting system 115 is closed.

The mechanism shown here is configured to carry the appliance 80, along with its appliance interface bracket 300 and aesthetic cover 90, far enough away from the support structure 60 for the most extreme protrusions to clear without interference. The linkage system then brings the appliance back toward the support structure and holds it in a 180° rotation parallel to the support structure and in proximity to it. In some applications it may be desirable for the appliance to extend further from the support structure and to rotate more than 180°, or to rotate in the opposite direction from what is illustrated in FIG. 28B and FIG. 28C.

Figure 36:
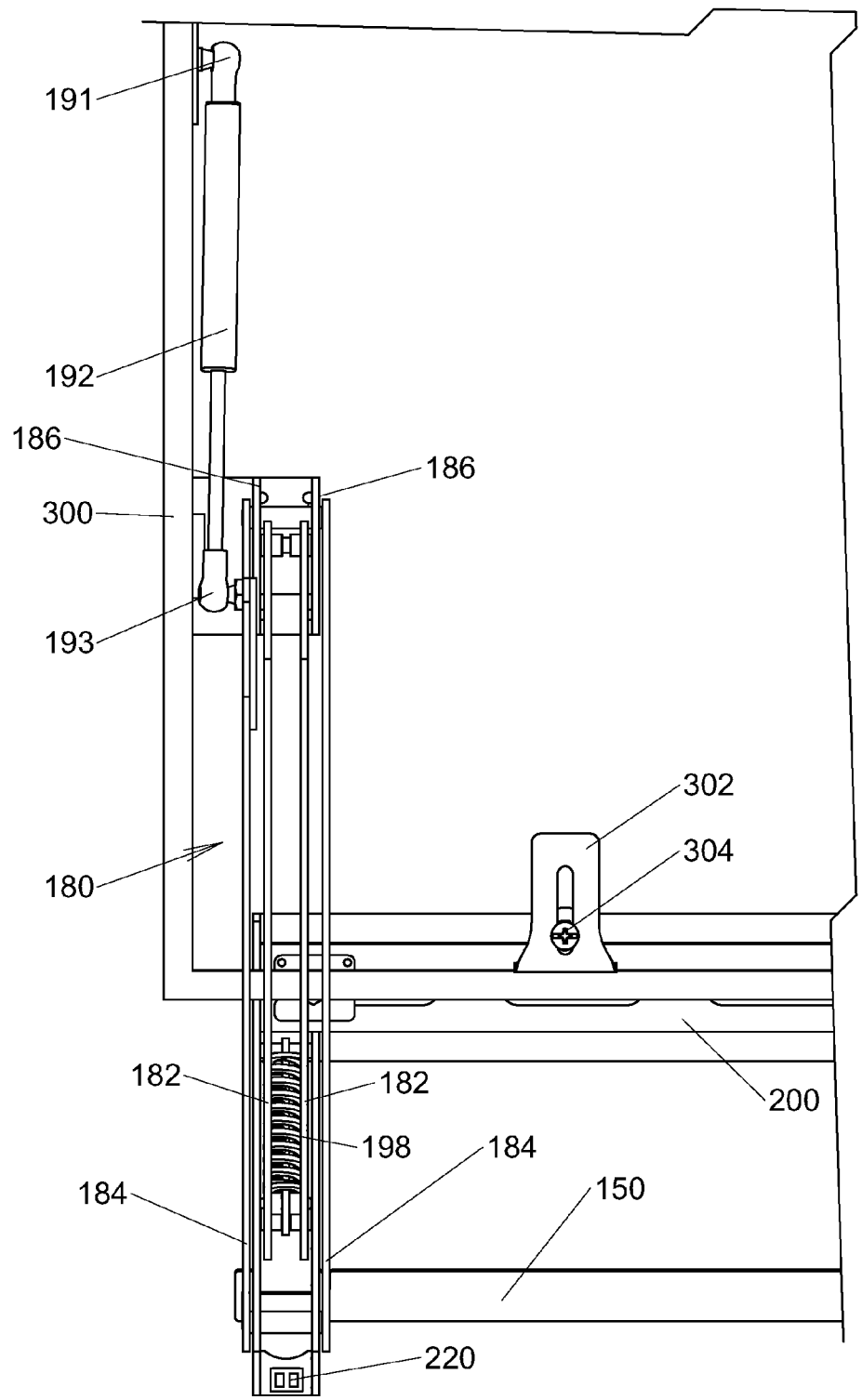
FIG. 36 shows a front view of the spring-driven mechanism used in the mounting system of FIG. 30.

As the mounting system 115 is operated to move the supported appliance through such a wide range of rotation, it is very important to do so smoothly and without any twisting or binding of the linkage system. To accomplish this, the two support arms 180 must operate in synchronism with one another. A rigid stabilizer 150, as shown in FIG. 28C and FIG. 36, is rigidly attached to the first link 182 of each support arm 180. The stabilizer 150 forces each support arm 180 to rotate at the same angular rate as the other so that neither will lead or lag.

Figure 29A:
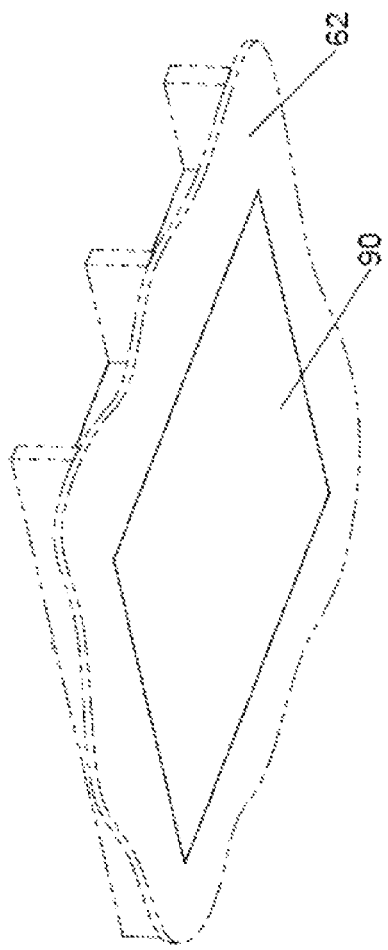
FIGS. 29A-D is a series of isometric drawings showing a mounting system used in a ceiling, beginning at FIG. 29A with the storage position where an appliance, such as a TV, is concealed behind a cover which is flush with the ceiling, proceeding to FIG. 29B where the mounting system has been released from the ceiling to expose the TV, to FIG. 29C where the TV is viewable from across the room, and completing the sequence in FIG. 29D with the TV flat against the ceiling but facing downward for viewing from below.
Figure 29B:
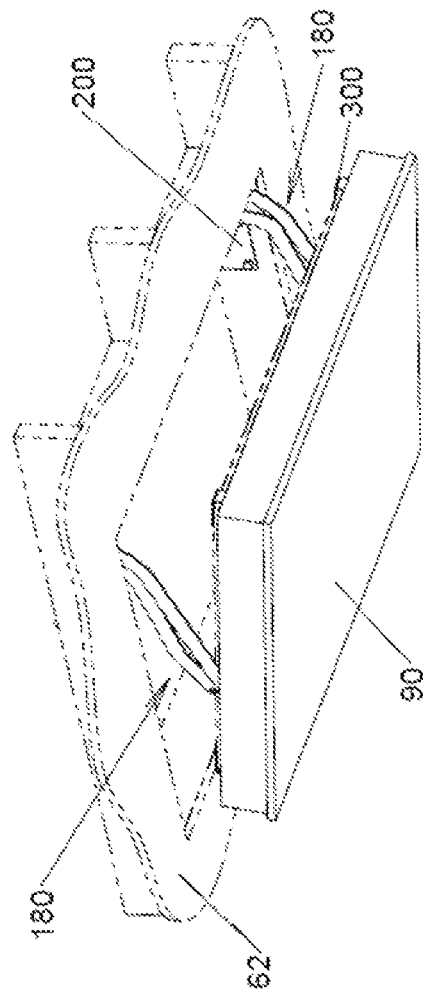

The mounting system shown here may be built into, or secured directly to, any suitable vertical, angled, or horizontal structure. Similar to FIG. 28, the sequence of isometric images in FIGS. 29A-29D depict an alternate configuration supported by the same mechanism. Here, FIG. 29A illustrates the appliance mounted in a closed position so as to be concealed into a ceiling. The cover 90 which is attached to the frame (not visible) is aligned flush with the ceiling 62. At FIG. 29B the appliance has been released to drop down from the ceiling into a partially opened position. At this point in the progression the appliance remains concealed by the cover 90. The two support arms 180 are pivotally attached to the mounting bracket 200 and the appliance interface bracket 300. The mounting bracket 200 can be fastened laterally between rafters or other side supports with lag bolts. The mounting system 115 can be driven by a motor attached to the mounting bracket 200 and connected to one of the support arms 180 at the pivot point connected to the appliance interface bracket 300.

Figure 29C:
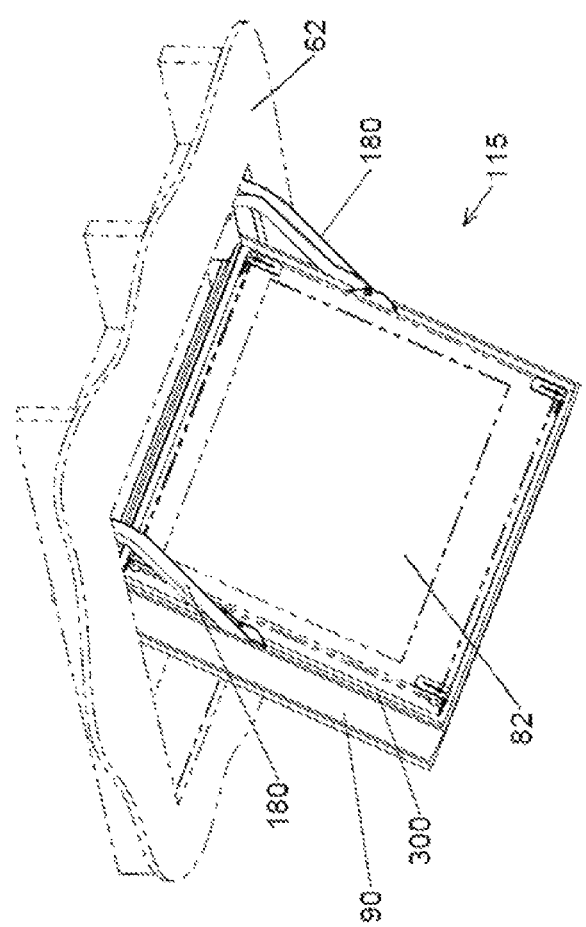
Figure 29D:
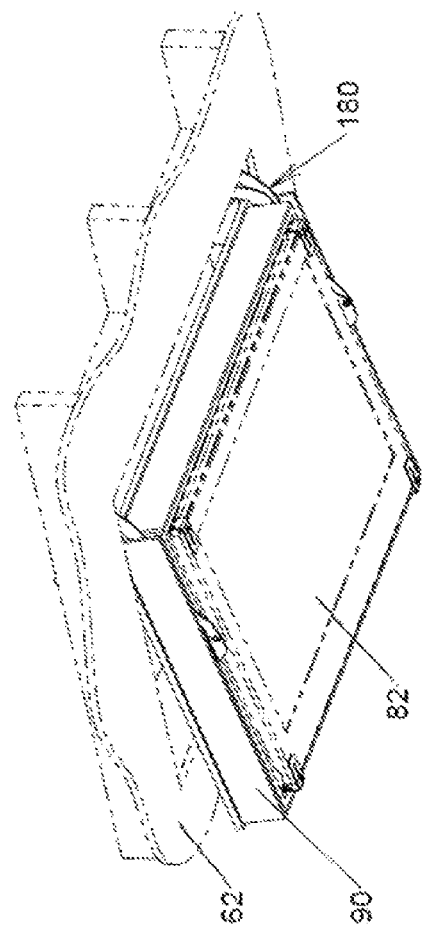

Following a partial rotation, the formerly concealed face of the appliance becomes visible in FIG. 29C. At this stage in the progression the appliance has been opened to allow the face 82 of the television 80 to be viewed or accessed from across the room. Continuing with rotation of the appliance, the formerly concealed face is inserted back into the cavity in the ceiling for a flush appearance following completion of a 180° rotation. When the mounted appliance is a flat-panel television, the result of the above described progression is a television that can be concealed into a ceiling and then reoriented to become flush-mounted into the ceiling for viewing by a person reclining below.

Using the same mechanical system, the linkages of the support arms 180 can be lengthened to allow the mounted appliance to be lowered by a greater distance for situations in which the mounting system is applied to an elevated surface such as a cathedral, or vaulted, ceiling. An alternate mounting of the mechanism would allow for a flush mount into a tabletop or a floor for viewing from above. Adjustments can be made to the mechanism where it is advantageous to provide a user with one position to be used when standing and another position for use while seated. Additionally, because this mechanism can flip the appliance end over end, different products or appliances can be mounted back-to-back, opposing one another, to allow access to one while in one position and another in an alternate position, or even to access both from an intermediate position.

When the appliance 80 supported by the presently described mounting system 115 is a flat-panel display, for instance, the closed positions of FIG. 28A and FIG. 29A conceal the face of the display. Rotation into the positions shown in FIGS. 28B and 29D allow the display to be accessed and viewed from beneath, such as by a person lying in bed. The complete 180° rotation of FIG. 28C and the partial rotation of FIG. 29C present the display in a proper orientation for viewing from across the room. By proper balancing of forces within the linkage system, the appliance 80 supported by the described mounting system 115 may be positioned to remain at any location along a defined path between the closed and fully opened positions without external user-supplied force.

A mounting bracket 200 is fastened to a support structure 60 by means of common hardware 70. Though some details are shown in FIGS. 28C and 29C, the following description is best viewed beginning at FIG. 30. Two pairs of support arms 182 and 184 are pivotally attached to the mounting bracket 200 at pivots 181 and 183, respectively. Support arm links 182 and 184 are also pivotally attached to the appliance interface bracket 300 at pivots 185 and 187, respectively, in such manner as to allow pivot connections 187 and 185 to avoid interference with support arms 182 or 184 when the mounting system is operated. The support flange 186 is fastened to the appliance interface bracket 300.

Four appliance mounts 310 are fastened to the appliance interface bracket 300 so as to allow the appliance mounts to be adjusted in or out to accommodate televisions or other appliances 80 having various shapes and dimensions. The appliance mounts 310 can be reversed for applications where it is desired that the appliance 80 face the opposite direction. The front, or operational, face 82 of the appliance 80 rests against the mounts 310.

To hold the appliance 80 in place while the mounting system 115 is operated, the appliance 80 must be held against the appliance mounts 310. This is accomplished by any of several means, including but not limited to springs, clips, cables, elastic bands, screws, clamps, and other suitable fasteners or devices that exert sufficient holding pressure. Depending on the application and appliance 80, one method may be more advantageous than another. In some configurations it is useful to attach a height adjustment bracket 312 to the appliance mounts 310 through slots or holes 314. Height adjustment bracket 312 can be adjusted up or down to accommodate differently sized appliances 80.

To assist in the synchronization of movement between the left and right pairs of support arm linkages (182, 184), the second links 184 of left and right support arms 180 are coupled through a connecting rod 188. Wiring for the appliance is guided along the support arm links 182 or 184 in recessed channels or by various means such as cable ties. Support arm links 182 or 184 are constructed to accommodate the weight of appliance 80. They may be manufactured from material such as flat, tubular, or channel stock. An advantage of tubular or channel stock, in addition to weight handling capacity, is that it is useful for concealing wiring such as power and control cables.

Though this configuration is not inherently counterbalanced, forces are neutralized so that the resulting mounting system 115 is stable when in an opened position while a variety of means are employed to offset forces in order to maintain a properly closed position. Such offsetting means include but are not limited to springs and latches. One possible latch is shown in the detail of FIG. 31. Here a push-touch latch 220, also known as a push-to-close, push-to-open latch, is installed between the mounting bracket 200 and the appliance interface bracket 300. As the mounting system 115 is pushed into the closed position, the push-touch latch 220 captures the appliance interface bracket 300 against the mounting bracket 200. Pushing again on the cover 90 or directly on the appliance interface bracket 300 releases the push-touch latch 220 allowing the mounting system 115 to unfold into an opened position away from the mounting bracket 200.

The detail of FIG. 35 related to this Flip-Around mounting system 115 of FIG. 34 includes mounting mechanisms for two different purposes. The appliance mount which includes a mounting screw 304, a resilient mount 305 and a nut 306 are attached to the mounting tab 302. This mechanism was described previously with regard to FIG. 13 for the Extended Flip-Out Mounting System 105.

Also shown in FIG. 35 is a mounting mechanism 92 for the cover 90. This mechanism may take many forms. The mechanism shown here is a screw inserted through a slot in the mounting tab 302 where the use of a slot provides adjustability. An alternative is to use a spring-loaded pin attached to the routing tab 302 which engages holes on an inner surface of the cover 90.

FIG. 30 and following show cross-sectional views of linkages for mounting systems 115 which have an additional built-in power source such as an electric motor, gas springs, torsion springs, or another type of mechanism that is capable of applying additional force. Since the configuration options available to power the described mounting system are numerous, only two examples will be given here while those skilled in the art will recognize other drive options.

Examples of two power sources are shown in FIGS. 30-34 and FIG. 36. Pivotally connected to the mounting bracket 200 and the connecting rod 188, a power source in the form of a coil spring 198 exerts force on the connecting rod 188 which is pivotally connected to the first link 182 of support arm 180. The force applied by the coil spring 198 counteracts the force exerted due to the weight of the appliance. Mounted to the appliance interface bracket 300 is a gas spring 192 which serves as another power source to transfer rotational force to the second link 184 of the support arm. The coil spring 198 works in conjunction here with the gas spring 192 to minimize the force differential to provide that the mounting system 115 be easily operated. When these two power sources are mounted in the positions shown here, the gas spring 192 applies a force that rotates the appliance interface bracket 300 inward while the coil spring 198 counters that force by pushing the support arm 180 outward. Other rotational power sources might be derived from belts and pulleys, or gears. Torsion springs can also be used at the pivot points where the support arms connect to the appliance interface bracket 300 frame or to the mounting bracket 200.

Figure 38:
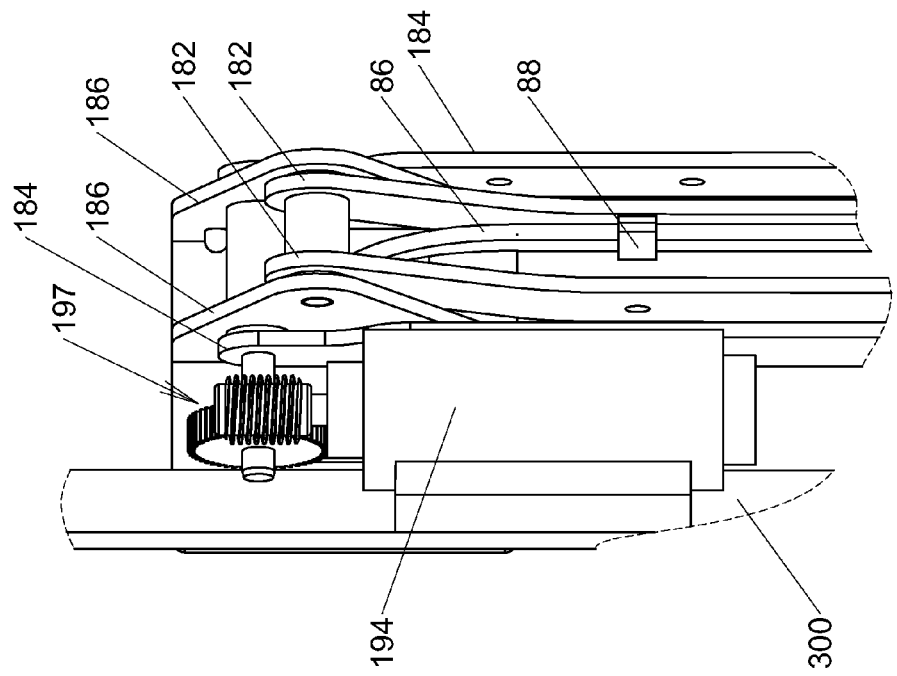
FIG. 38 is an isometric view of a mounting system using a motor-driven gear to control opening and closing operations.
Figure 37:
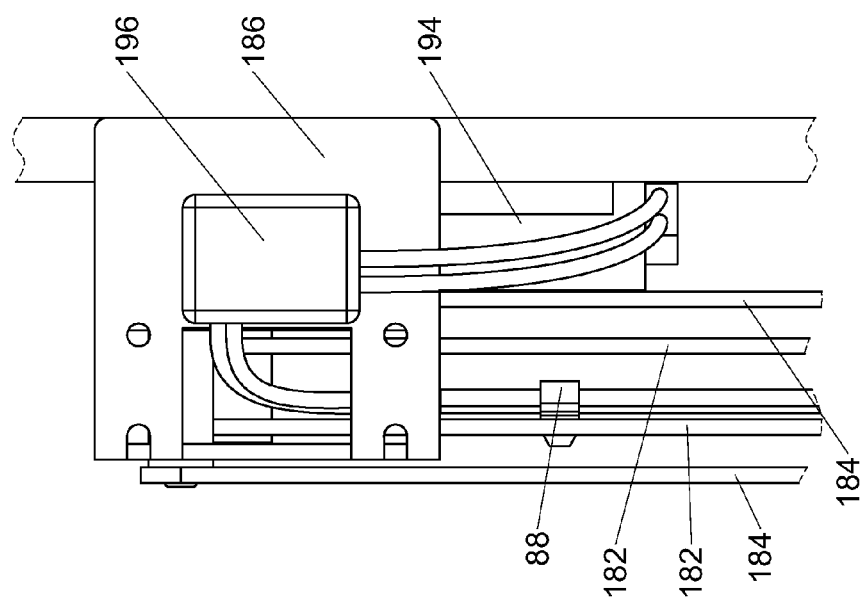
FIG. 37 depicts one possible placement for a remote control within the mounting system.

The use of the electric motor 194 to power a gear driven system is shown in FIGS. 37 and 38. The shaft of the rotary motor 194 is coupled to a gear drive 197 which applies force between the appliance interface bracket and the support arm 180. To avoid pinching or stretching wires 86 they are held in place by wire guides 88 as they are routed along various brackets and support arms. The motor control 196 of FIG. 36 contains the necessary component to provide either wired or wireless remote control to the motor 194. These components may include such items as a wireless receiver, relays or other switches, limit switches to protect a stalled motor, etc.

The various embodiments of mounting systems described above may be operated manually or with the assistance of electric motors. Springs or other devices capable of exerting force can be used to assist in operation. A variety of springs or other power sources may be adapted to the various configurations with some forms being more readily adaptable than others to a given configuration. In order to hold the appliance firmly in a particular position may be advantageous to include springs, plunger ball pins, set pins, spring pins, friction, or other suitable means.

It should be noted that the presently described mounting systems may be adapted for use in hospitals or other medical or dental facilities, food-related industries, military applications, automobile, airplane or boat applications, hotels, or other commercial uses. Though particular applications of the mounting systems may have mentioned or suggested use in a particular attitude, these devices may be used to provide access to an appliance by users when prone, supine, standing or seated.

Components of the mounting systems described here, especially linkage arms and pivots, may be constructed from any materials which possess the requisite structural capabilities, such as but not limited to various metals, composite materials, plastics, or wood. It will be recognized by those skilled in the art that materials, dimensions and interconnections must be selected to adapt to varying weights, sizes and shapes of appliances which will be mounted as loads to the mounting systems. Variations of linkages, gears, chains, pulleys, cables, motors, actuators, springs, and other mechanical components can be used within the described mounting systems to achieve various desired movements. Depending on the application, some fastening components may be made permanent or they can be made to be assembled or disassembled easily for packaging, manufacturing, or other considerations of user preference.

The positions identified here as "open" are for purposes of illustration and it is recognized that in some cases a more horizontal or vertical open position with greater or lesser extension and height may be desired. Relatively slight alterations to the mechanisms illustrated in this application with regard to the placement of pivots and the relative lengths of linkage arms can achieve a wide variety of open positions.

Adjustment mechanisms can be applied at one or more points to allow adjustment of the closed assembly to accommodate different display thicknesses and to accommodate user preferences for a particular placement of an appliance when in the open position. Such adjustment mechanisms may include additional apertures in links or link brackets where they attach to the appliance interface bracket or mounting bracket to allow different attachment configurations. Adjustments may provide the ability to modify the effective length of a link through a threaded rod or a channel and bolt application, or the ability to vary the position of a connection through a selection of alternative apertures, or an adjustable bolt, link, slide, or other suitable mechanism.

Modifications can be made to the mounting bracket that fastens to the supporting structure in order to accommodate different shapes and characteristics of various supporting structures and applications. Alternative apertures or channels may be fabricated into the mounting bracket to accept a wide variety of hardware. Additionally, the flanges into which the holes or channels are fabricated can be extended or new flanges can be added to accommodate characteristics of the application. The described mounting systems can be mounted to a support structure through standard fasteners, adhesives, or through mating two-part, male-female, attachment mechanisms such as hooks and slots.

The described mounting systems are adaptable to accommodate any size of appliance. A universal appliance interface bracket provides capability to support a variety of display devices using hardware that mates directly with the existing mounting points of a wide selection of displays. Some mounting methods include a rigid mount fastened to the frame with a series of apertures and channels that correlate to the mounting holes of various commonly available displays. Alternatively, a series of apertures and channels can be fabricated, such as from bars which can move on tracks attached to the frame of the appliance interface bracket, to allow adjustment and alignment to the mounting hole locations of the display. Another option includes oversized holes cut into a structure attached to the frame of the appliance interface bracket to which the display can be mounted with screws and oversized washers.

Depending on the specific mechanical linkages and drive systems that are used, a power source offers an option to achieve a desired motion within the mounting system. Here, a power source may be anything that creates force used to manipulate movement within the described mounting system. Springs and motors are only two examples of potential power sources. Placement of a power source and methods of transferring the power to the mechanism are generally understood by those skilled in the art. Techniques for counterbalancing may be applied to the mounting systems shown here in order to minimize the force that must be applied by a power source or by a person to open or close a particular system.

There are many methods for managing the speed and acceleration of appliance motion as the described mounting systems transition between closed and opened, or between storage and operational, positions. Damping mechanisms in various locations may be used to assist in management of speed and to ensure that a particular mounting system does not close too quickly or fly open. Such methods are considered to know to those persons operating in this field.

There are many alternative ways to trigger movement of a mounting system to open or close. In the situation where it is motorized, it can be operated through a wireless remote control and receiver or through a wired remote control such as switches or buttons mounted to or around the mounting system. A wide variety of devices are known that can be used to operate the electrical circuit to the motor such as an audibly activated or light-sensitive receiver.

Where a motor is not used, there are many latches and release mechanisms that can be used to a mounting system in a desired position. A few such mechanisms include grab catches, push-to open catches, cam latches, draw latches, sprung slide bolt latches, magnetic catches, spring-loaded pressure catches, or ball catches, for example. A latch can be released by a system of links, slides, and/or cables connected to a handle, button, or lever which is accessible to a user.

In some configurations where a spring is used, the described mounting systems use the same spring in a dual purpose to assist in opening and closing. Structural components can be added to limit movement. When an electric motor is used, electric sensors can be used to limit the movement of the motor when opening and closing any of the described mounting systems by switching the motor off when the appliance has been placed into the desired position.

A few methods have been illustrated for concealing wiring or control cables, the flat-panel display or other appliance, and the various mounting mechanisms. However, the aesthetic variations adaptable to the described mounting systems are numerous and extend beyond those shown in the included illustrations. The back and side of the flat-panel display, or other appliance, can be concealed by many materials and methods. As shown on some of the drawings, a picture can be used to conceal the back of the display, however any other methods can be used for this purpose. The sides can be concealed in many fashions including wood, plastic, fabric, painted metal, etc. The wires running from the display also can be concealed by many methods and with many different materials. These materials may be included in the manufacture of the structural members or maybe fabricated to mount to the structural members. Many options for concealment will be recognized by those skilled in the related arts.

The aesthetic pieces of the described mounting systems can be attached to the structural components in a permanent manner or in one that allows easy assembly, disassembly, or interchangeability by the user. Of course, aesthetic covers are optional depending on the user's desires. For applications where aesthetics are not important the described mounting systems can be simplified to include only those components needed for the structural and mechanical aspects of the desired mounting system.

Access apertures may be incorporated into the mounting and appliance interface brackets to allow the wires or other control cables to pass. The described mounting systems can be resized to accommodate easily accessible storage for remote controls or other items related to the flat-panel display or other appliance. Extra storage areas with or without operable covers can be incorporated into the described mounting systems as part of the housing or the support where the system is attached. A lamp may be installed as part of a mounting system to provide the user with quick access to illumination. This may be useful when trying to find a remote control when the room is dark or while reading in bed.

Any of the described mounting systems can be manufactured in a prewired configuration with connections for a flat-panel display that will be installed by an end-user. Such pre-wiring may include electrical outlets as well as audio/video connections. A miscellany from among clocks, radios, or alarms can be incorporated into a mounting system for the convenience of the user. In some configurations, it may be necessary to incorporate cooling systems for the electronics, such as vents and/or fans.

Three basic linkage systems have been illustrated here, each showing different elements and concepts. Those skilled in the arts will recognize that some features of systems should be considered interchangeable since they can be combined in various ways to meet a specific desired result that is not shown here explicitly. In some cases an item may be labeled as an arm which is effectively the same as a link with the primary difference being in its appearance and its ability to hide other links or mechanisms and wires as they are routed to the display.

Though the present invention has been described with reference to a few particular embodiments, various modifications will be apparent to those skilled in the art. Therefore, it is not intended that the invention be limited to the disclosed embodiments or their details, as variations can be made within the spirit and scope of the appended claims.

What is claimed is:

1. A mounting system comprising:
   a mounting bracket adapted to be coupled to a fixed structure;
   an appliance interface bracket adapted to be coupled to an appliance; and
   a linkage system operably coupling the appliance interface bracket and the mounting bracket such that there is no direct pivotal connection between the appliance interface bracket and the mounting bracket, and
   wherein the appliance has a working face and an attachment base, and
   wherein the linkage system is operable to selectively place the appliance in at least two positions relative to the mounting bracket without encountering interference along a path between a first position of the at least two positions and a second position of the at least two positions,
   wherein the first position places the face of the appliance in a plane parallel to and proximal to the fixed structure, and
   wherein the second position places the face of the appliance into a working position, and
   wherein the plane containing the face of the appliance in the second position is rotated by at least 60° about a horizontal axis from the plane of the first position.

2. The mounting system of claim 1, wherein a transition between the first position and the second position causes the face of the appliance to rotate 180° about a horizontal axis.

3. The mounting system of claim 1, wherein the first position is a closed position and the second position is an opened position, and
   wherein the appliance interface bracket is adapted for attachment of a cover, and
   wherein the cover completely conceals the mounting system and the appliance when the mounting system is in the closed position, and
   wherein the cover remains attached to the appliance interface bracket during any transition between the closed position and the opened position.

4. The mounting system of claim 3, wherein the cover comprises:
   a main body;
   a side portion; and
   a hinge mechanism,
   wherein the side portion is hingedly connected to the main body by the hinge at a location that places the side portion at a top of the main body when the cover is in the closed position and allows the side portion to fall hingedly away from the main body as the appliance interface bracket is rotated during any transition between the closed position and the opened position.

5. The mounting system of claim 1, wherein the appliance is a flat-panel display, and wherein the working face of the appliance is a display face of the flat-panel display.

6. The mounting system of claim 5,
   wherein the flat-panel display is completely concealed when in the first position, and
   wherein the second position is a viewing position.

7. The mounting system of claim 1, wherein the first position and the second position are two of a continuum of positions along a defined path.

8. The mounting system of claim 7, wherein the appliance is a load on the mounting system, and
   wherein each position along the defined path remains stable independent of the load.

9. The mounting system of claim 1, wherein the linkage system comprises a single support arm.

10. The mounting system of claim 1, wherein the linkage system comprises two support arms and a stabilizer, wherein the stabilizer is rigid and is rigidly connected at a first end to a first of the two support arms and is rigidly connected at a second end to a second of the two support arms, whereby the two support arms operate synchronously.

11. The mounting system of claim 1, wherein the appliance interface bracket comprises clamps for coupling to the appliance.

12. The mounting system of claim 1, wherein the appliance interface bracket comprises resilient mounts for coupling to the appliance.

13. The mounting system of claim 1, wherein the appliance interface bracket comprises adjustable mounts, whereby a mounted appliance may be uncoupled from the appliance interface bracket and a successor appliance having dimensions that differ from the mounted appliance may be coupled to the appliance interface bracket.

14. The mounting system of claim 1, wherein the linkage system comprises:
   a lower support arm including a first link and a second link; and
   an upper support arm including a third link and a fourth link,
   wherein a first end of the first link and a first end of the second link are pivotally attached to the mounting bracket,
   a second end of the first link is pivotally attached to the third link at a first pivot proximal to a first end of the third link,
   a second end of the second link is pivotally attached to the third link at a second pivot proximal to the first end of the third link and offset from the first pivot,
   a second end of the second link is pivotally attached to a first end of the fourth link,
   a second end of the third link is pivotally attached to the appliance interface bracket, and a second end of the fourth link is pivotally attached to the appliance interface bracket,
   whereby rotation of the lower support arm in a clockwise direction with respect to the mounting bracket causes the upper support arm to rotate in counterclockwise direction, and vice versa.

15. The mounting system of claim 1, wherein the linkage system comprises:
   a first link;
   a second link;
   a third link; and
   a fourth link,
   wherein a first end of the first link is pivotally attached to the mounting bracket,
   a second end of the first link is pivotally attached to the appliance interface bracket,
   a second end of the second link is pivotally attached to the appliance interface bracket, the third link is pivotally attached to the first link at an offset from the first end of the first link toward the second end of the first link, and is pivotally attached to a first end of the second link, and the fourth link is pivotally attached to the mounting bracket and is pivotally attached to the third link.

16. The mounting system of claim 1, wherein the linkage system comprises:

a first link; and a second link;

wherein a first end of the first link is pivotally attached to the mounting bracket, a first end of the second link is pivotally attached to the mounting bracket, a second end of the first link is pivotally attached to the appliance interface bracket, a second end of the second link is pivotally attached to the appliance interface bracket; and whereby the appliance interface bracket is rotatable by 180° with respect to the mounting bracket.

* * * * *